(12) United States Patent
Yin et al.

(10) Patent No.: US 10,306,630 B2
(45) Date of Patent: May 28, 2019

(54) SYSTEMS AND METHODS FOR DETERMINING FRAME STRUCTURE AND ASSOCIATION TIMING

(71) Applicant: Sharp Laboratories of America, Inc., Camas, WA (US)

(72) Inventors: Zhanping Yin, Vancouver, WA (US); Toshizo Nogami, Vancouver, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 15/719,040

(22) Filed: Sep. 28, 2017

(65) Prior Publication Data

US 2018/0092089 A1 Mar. 29, 2018

Related U.S. Application Data

(63) Continuation of application No. PCT/US2017/053735, filed on Sep. 27, 2017.
(Continued)

(51) Int. Cl.
*H04W 72/04* (2009.01)
*H04W 72/12* (2009.01)
(Continued)

(52) U.S. Cl.
CPC ....... *H04W 72/0446* (2013.01); *H04L 1/1812* (2013.01); *H04L 5/0055* (2013.01);
(Continued)

(58) Field of Classification Search
CPC combination set(s) only.
See application file for complete search history.

(56) References Cited

U.S. PATENT DOCUMENTS 8,885,526 B2 * 11/2014 He ............... H04W 72/0413
370/280
9,907,055 B2 * 2/2018 Yang ............ H04W 72/0406
(Continued)

FOREIGN PATENT DOCUMENTS

WO 2015190844 12/2015
WO 2016048051 3/2016
(Continued)

OTHER PUBLICATIONS

International Search Report and Written Opinion issued for PCT Application No. PCT/US2017/053735 dated Dec 12, 2017.
(Continued)

*Primary Examiner* — Edan Orgad
*Assistant Examiner* — Emmanuel K Maglo
(74) *Attorney, Agent, or Firm* — Austin Rapp

(57) ABSTRACT

A user equipment (UE) is described. The UE includes a processor. The UE also includes memory in electronic communication with the processor. Instructions stored in the memory are executable to determine a radio frame structure based on a self-contained subframe pattern. The instructions are also executable to receive a downlink data assignment and decode downlink data. The instructions are further executable to determine a hybrid automatic repeat request acknowledgement/negative acknowledgement (HARQ-ACK) feedback timing of the downlink data. The instructions are additionally executable to transmit HARQ-ACK feedback of the downlink data based on the determined HARQ-ACK feedback timing. The instructions are also executable to receive uplink scheduling information. The instructions are further executable to determine an uplink scheduling timing for a scheduled uplink transmission. The instructions are additionally executable to transmit uplink data in a scheduled subframe.

4 Claims, 14 Drawing Sheets

Related U.S. Application Data

(60) Provisional application No. 62/401,782, filed on Sep. 29, 2016.

(51) Int. Cl.
  *H04L 1/18* (2006.01)
  *H04L 5/00* (2006.01)
  *H04W 88/08* (2009.01)
  *H04W 88/02* (2009.01)

(52) U.S. Cl.
  CPC ... *H04W 72/0406* (2013.01); *H04W 72/1278* (2013.01); *H04L 5/0094* (2013.01); *H04W 88/02* (2013.01); *H04W 88/08* (2013.01)

(56) References Cited

U.S. PATENT DOCUMENTS

| | | | | |
|---|---|---|---|---|
| 2013/0336160 | A1* | 12/2013 | Yin | H04L 1/1854 370/254 |
| 2015/0271837 | A1* | 9/2015 | Larsson | H04L 1/1861 370/329 |
| 2016/0043843 | A1* | 2/2016 | Liu | H04L 5/0048 370/329 |
| 2016/0270070 | A1* | 9/2016 | Mukkavilli | H04W 72/0446 |
| 2017/0026992 | A1* | 1/2017 | Jiang | H04L 5/1469 |
| 2017/0366311 | A1* | 12/2017 | Iyer | H04L 5/005 |
| 2018/0049046 | A1* | 2/2018 | Lunttila | H04W 24/02 |

FOREIGN PATENT DOCUMENTS

| | | |
|---|---|---|
| WO | 2016064048 | 6/2016 |
| WO | 2016064059 | 6/2016 |

OTHER PUBLICATIONS

Huawei, HiSilicon, "Discussion on timing relations for NR frame structure", 3GPP TSG RAN WG1 meeting #86, Gothenburg, Sweden, R1-166105, Aug. 26, 2016.

MCC Support, "Final Report of 3GPP TSG RAN WG1 #85 v1.0.0", 3GPP TSG RAN WG1 Meeting #86, Goteborg, Sweden, R1-166056, Aug. 26, 2016.

MCC Support, "Final Report of 3GPP TSG RAN WG1 #86 v1.0.0", 3GPP TSG RAN WG1 Meeting #86bis, Lisbon, Portugal, R1-1608562, Oct. 14, 2016.

* cited by examiner

US 10,306,630 B2

SYSTEMS AND METHODS FOR DETERMINING FRAME STRUCTURE AND ASSOCIATION TIMING

RELATED APPLICATIONS

This application is related to and claims priority from U.S. Provisional Patent Application No. 62/401,782, entitled "SYSTEMS AND METHODS FOR DETERMINING FRAME STRUCTURE AND ASSOCIATION TIMING," filed on Sep. 29, 2016, which is hereby incorporated by reference herein, in its entirety.

TECHNICAL FIELD

The present disclosure relates generally to communication systems. More specifically, the present disclosure relates to user equipments (UEs), base stations and methods.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
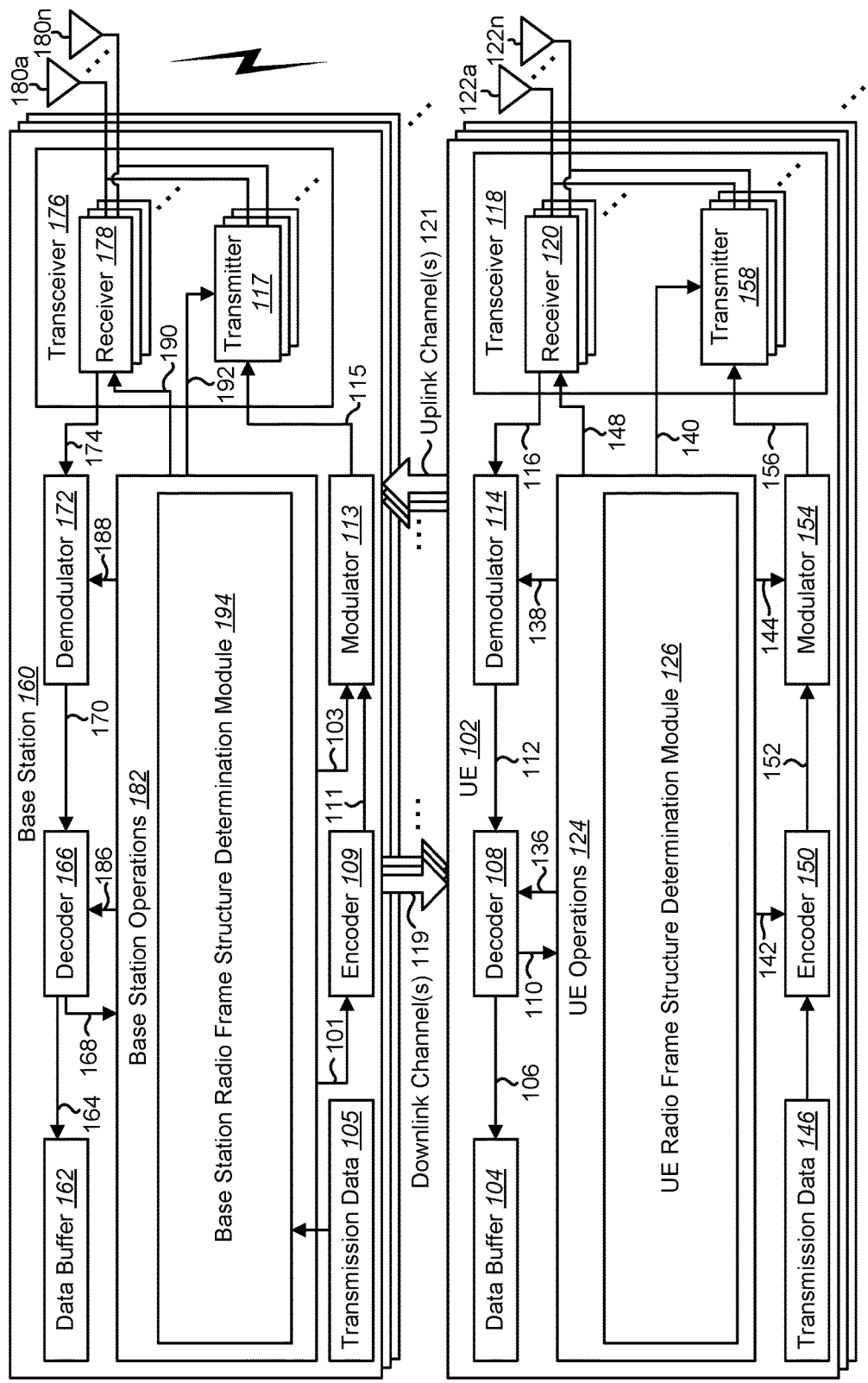
FIG. 1 is a block diagram illustrating an example of one or more base stations and one or more UEs in which systems and methods for determining frame structure and association timing may be implemented.

A user equipment (UE) is described. The UE includes a processor and memory in electronic communication with the processor. Instructions stored in the memory are executable to determine a radio frame structure based on a self-contained subframe pattern. The instructions are also executable to receive a downlink data assignment and decode downlink data. The instructions are further executable to determine a hybrid automatic repeat request acknowledgement/negative acknowledgement (HARQ-ACK) feedback timing of the downlink data. The instructions are additionally executable to transmit HARQ-ACK feedback of the downlink data based on the determined HARQ-ACK feedback timing. The instructions are also executable to receive uplink scheduling information. The instructions are further executable to determine an uplink scheduling timing for a scheduled uplink transmission. The instructions are additionally executable to transmit uplink data in a scheduled subframe.

A radio frame may contain at least one self-contained subframe in the self-contained subframe pattern. A self-contained subframe may be a subframe including at least a downlink part, a gap period, and an uplink part.

The radio frame may have 10 subframes or a multiple of 10 subframes. A self-contained subframe may be configured every 2 subframes, every 5 subframes, every 10 subframes, or a multiple of 10 subframes. The radio frame may have a power of 2 subframes and a self-contained subframe may be configured every power of 2 subframes.

A subframe allocation of one or more other subframes besides the self-contained subframe pattern in a radio frame may be allocated semi-statically by higher layer signaling. The subframe allocation of other subframes besides the self-contained subframe pattern in a radio frame may be dynamically allocated by a layer 1 (L1) signaling.

The HARQ-ACK feedback timing may be determined by the radio frame structure. The HARQ-ACK feedback of the downlink data may be reported in an uplink part of an earliest self-contained subframe/slot (e.g., subframe and/or slot) or the uplink subframe/slot immediately after a self-contained subframe. The HARQ-ACK feedback timing may be determined by a downlink control information (DCI) format.

A downlink data assignment may use a short DCI format that contains no explicit timing information. The HARQ-ACK feedback of the downlink data may be reported with implicit timing. A downlink data assignment may use a long DCI format that contains explicit timing information. The HARQ-ACK feedback of the downlink data may be reported with explicit timing in an indicated uplink subframe or an uplink part of a self-contained subframe.

The uplink scheduling timing may be determined by a DCI format. An uplink scheduling may use a short DCI format that contains no explicit timing information. The instructions may be executable to transmit the uplink data in an earliest uplink subframe or an uplink part of a self-contained subframe. An uplink scheduling may use a long DCI format that contains explicit timing information. The instructions may be executable to transmit the uplink data in an explicitly indicated uplink subframe or an uplink part of a self-contained subframe.

A base station communicating with a UE is also described. The base station includes a processor and memory in electronic communication with the processor. Instructions stored in the memory are executable to determine a radio frame structure based on a self-contained subframe pattern. The instructions are also executable to transmit a downlink data assignment and downlink data. The instructions are further executable to determine a HARQ-ACK feedback timing of the downlink data. The instructions are additionally executable to receive the HARQ-ACK feedback of the downlink data based on the determined HARQ-ACK feedback timing. The instructions are also executable to transmit an uplink scheduling information. The instructions are further executable to determine an uplink scheduling timing for the scheduled uplink transmission. The instructions are additionally executable to receive the uplink data in the scheduled subframe.

The radio frame may contain at least one self-contained subframe in the self-contained subframe pattern. A self-contained subframe may be a subframe including at least a downlink part, a gap period, and an uplink part.

The radio frame may have 10 subframes or a multiple of 10 subframes. A self-contained subframe may be configured every 2 subframes, 5 subframes, or 10 subframes, or a multiple of 10 subframes. The radio frame may have a power of 2 subframes and a self-contained subframe may be configured every power of 2 subframes.

A subframe allocation of one or more other subframes besides the self-contained subframe pattern in a radio frame may be allocated semi-statically by higher layer signaling. The subframe allocation of one or more other subframes besides the self-contained subframe pattern in a radio frame may be dynamically allocated by layer 1 (L1) signaling.

The HARQ-ACK feedback timing may be determined by the radio frame structure. The HARQ-ACK feedback of the downlink data may be reported in an uplink part of an earliest self-contained subframe/slot or the uplink subframe/slot immediately after the self-contained subframe. The HARQ-ACK feedback timing may be determined by a DCI format.

A downlink data assignment may use a short DCI format that contains no explicit timing information. The HARQ-ACK feedback of the downlink data may be reported with implicit timing.

A downlink data assignment may use a long DCI format that contains explicit timing information. The HARQ-ACK feedback of the downlink data may be reported with explicit timing in an indicated uplink subframe or an uplink part of a self-contained subframe.

The uplink scheduling timing may be determined by a DCI format. An uplink scheduling may use a short DCI format that contains no explicit timing information. The uplink data may be received in an earliest uplink subframe or an uplink part of a self-contained subframe. An uplink scheduling may use a long DCI format that contains explicit timing information. The uplink data may be received in an explicitly indicated uplink subframe or an uplink part of a self-contained subframe.

A method for a UE is also described. The method includes determining a radio frame structure based on a self-contained subframe pattern. The method also includes receiving a downlink data assignment and decoding downlink data. The method further includes determining a (HARQ-ACK) feedback timing of the downlink data. The method additionally includes transmitting HARQ-ACK feedback of the downlink data based on the determined HARQ-ACK feedback timing. The method also includes receiving uplink scheduling information. The method further includes determining an uplink scheduling timing for a scheduled uplink transmission. The method additionally includes transmitting uplink data in a scheduled subframe.

A method for a base station is also described. The method includes determining a radio frame structure based on a self-contained subframe pattern. The method also includes transmitting a downlink data assignment and downlink data. The method further includes determining a HARQ-ACK feedback timing of the downlink data. The method additionally includes receiving the HARQ-ACK feedback of the downlink data based on the determined HARQ-ACK feedback timing. The method also includes transmitting an uplink scheduling information. The method further includes determining an uplink scheduling timing for the scheduled uplink transmission. The method additionally includes receiving the uplink data in the scheduled subframe.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

Fifth-generation wireless systems (5G) may include new radio access technology (RAT), which may be referred to as "new radio" or "new RAT" (NR). In NR, several different subframe structures may be supported. However, dynamic or semi-static allocation for downlink (DL) and uplink (UL) resources need to be defined. Some implementations of the systems and methods disclosed herein may provide frame structure and association timing for NR.

In some implementations, hybrid automatic repeat request acknowledgement/negative acknowledgement (HARQ-ACK) timing for a downlink or uplink transmission may be more flexible and indicated by the base station. Detailed approaches to implicitly or explicitly determine the HARQ-ACK timing or scheduling timing still need to be defined. All of these problems may need to be resolved for 5G.

At least some aspects of the systems and methods disclosed herein may be described in relation to the 3GPP Long Term Evolution (LTE), LTE-Advanced (LTE-A), NR, and/or other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a user equipment (UE), an access terminal, a subscriber station, a mobile terminal, a remote station, a user terminal, a terminal, a subscriber unit, a mobile device, etc. Examples of wireless communication devices include cellular phones, smart phones, tablet devices, personal digital assistants (PDAs), laptop computers, netbooks, e-readers, wireless modems, game consoles, etc. In 3GPP specifications, a wireless communication device is typically referred to as a UE. However, as the scope of the present disclosure should not be limited to the 3GPP standards, a "UE" as described herein may be alternatively implemented as a "wireless communication device" and/or the term "UE" may be interchanged with the more general term "wireless communication device." A UE may also be more generally referred to as a terminal device.

In 3GPP specifications, a base station is typically referred to as a Node B, an evolved Node B (eNB), a home enhanced or evolved Node B (HeNB), a new RAT next generation Node B (gNB) or some other similar terminology. It should be noted that gNB may be a term used in 3GPP architecture discussions. As the scope of the disclosure should not be limited to 3GPP standards, a "Node B," "eNB," "HeNB," and/or "gNB" may be alternatively implemented as a "base station" and/or one or more of the foregoing terms (i.e., "Node B," "eNB," "HeNB," and/or "gNB") may be interchanged with the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may refer to any set of communication channels over which the protocols for communication between a wireless communication device (e.g., UE) and a base station (e.g., eNB, gNB, etc.) that may be specified by standardization or governed by regulatory bodies to be used for International Mobile Telecommunications-Advanced (IMT-Advanced) or its extensions and all of it or a subset of it may be adopted by 3GPP as licensed bands (e.g., frequency bands) to be used for communication between a base station and a wireless communication device. "Configured cells" are those cells of which the wireless communication device is aware and is allowed by a base station to transmit or receive information. "Configured cell(s)" may be serving cell(s). A UE may receive system information and perform the required measurements on all configured cells. "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

It should be noted that the term "concurrent" and variations thereof as used herein may denote that two or more events may overlap each other in time and/or may occur near in time to each other. Additionally, "concurrent" and variations thereof may or may not mean that two or more events occur at precisely the same time. It should be noted that the term "semi-statically" and variations thereof as used herein may denote that the configuration is done by higher layer signaling. The higher layer signaling may include Radio Resource Control (RRC) signaling. It should be noted that the term "dynamically" and variations thereof as used herein may denote that the indication is done by the L1 downlink signaling. The L1 downlink signaling may transmit on a PDCCH.

Several potential subframe structures are described in accordance with the systems and methods disclosed herein. Subframe configuration in a radio frame or a superframe structure and the impact to HARQ-ACK report timing is also described. For example, the systems and methods disclosed herein may address approaches to determine the downlink data transmission and the corresponding HARQ-ACK feedback based on the configured radio frame structure.

Some aspects of the systems and methods disclosed herein may include one or more of the following. At least one self-contained subframe may be included in a radio frame or a superframe. A self-contained subframe pattern (e.g., a pattern of one or more self-contained subframes) may be applied in a radio frame or a superframe. The self-contained subframe pattern may be cell specific. The self-contained subframe pattern may be UE group specific. The self-contained subframe pattern may be UE specific. The allocation of one or more remaining subframes may be semi-statically or dynamically allocated. The dynamic allocation may be signaled by a downlink control information (DCI) in a control region of a self-contained subframe of the configured pattern. The DCI signaling may be cell specific or UE group specific or UE specific. A default downlink HARQ-ACK timing may be implicitly determined by the self-contained subframe pattern in a radio frame or a superframe.

New HARQ-ACK timing may be applied if a new self-contained or uplink subframe is included in a radio frame or superframe. The HARQ-ACK timing may be implicit by insertion of a self-contained or uplink subframe. The HARQ-ACK timing may be explicit in DCI format. New HARQ-ACK timing may be UE specific. New HARQ-ACK timing may be service dependent.

Different DCI formats may be used for default HARQ-ACK timing and may be revised with explicit HARQ-ACK timing. A compact or short DCI may be used to schedule downlink data with default HARQ-ACK timing. A long DCI may be used to schedule downlink data with explicitly indicated HARQ-ACK timing.

Different DCI formats may be used for uplink scheduling. A compact or short DCI may be used to schedule an uplink transmission in the earliest uplink subframe. A long DCI may be used to schedule an uplink transmission with explicitly indicated timing.

Some detail regarding NR subframe frame structure and HARQ-ACK timing is given as follows. In NR, new or different frequency bands may be allocated. Some example of available bands may be at a high frequency, such as 25 gigahertz (GHz), 35 GHz, and 60 GHz, etc. At high frequency, a carrier may have much wider bandwidth than a legacy LTE carrier of 20 megahertz (MHz). A NR radio may use much larger subcarrier spacing and much shorter symbol length. As a result, time division duplexing (TDD) may be beneficial.

The radio frame structure of a NR carrier or a NR cell may be described as follows. For NR, at least 3 subframe types may be supported in NR: downlink only (e.g., a subframe reserved for downlink transmissions only), uplink only (e.g., a subframe reserved for uplink transmissions only), and a self-contained subframe with both downlink and uplink (e.g., a subframe reserved for both downlink and uplink transmissions only). Namely, the radio frame may include (e.g., consist of) a downlink only subframe, an uplink only subframe, and/or a self-contained subframe. The pattern of the downlink only subframe, the uplink only subframe, and/or the self-contained subframe within the radio frame may be defined. Here, the pattern of the downlink only subframe, the uplink only subframe, and/or the self-contained subframe may indicate which subframes are used for downlink transmissions only, uplink transmissions only, and/or both downlink and uplink transmissions.

In a downlink only subframe, the subframe may contain a downlink control part for data assignment and a downlink data part. A gap period or guard region may exist at the end of a downlink only subframe if the downlink only subframe occurs immediately before an uplink only subframe without a gap period.

An uplink only subframe may include two cases: a subframe contains only an uplink data part, or a subframe contains an uplink data part and an uplink control part. In both cases, a gap period or guard region may exist at the beginning of an uplink only subframe if it immediately follows a downlink only subframe.

A self-contained subframe may include (at least, for example) a downlink part, a gap period, and an uplink part. A downlink dominate subframe may include a downlink control part, a downlink data part, gap period, and/or an uplink control part. An uplink dominate subframe may include a downlink control part, a gap period, an uplink data part, and/or an uplink control part. A balanced subframe structure may include a downlink control part, a downlink data part, a gap period, an uplink data part, and/or an uplink control part. The length of downlink data part and uplink data part may be flexible and/or configurable.

A self-contained subframe may have the capability to provide immediate uplink control information (UCI) feedback in the uplink control part for the downlink data part within the same subframe (i.e., the same self-contained subframe). Thus, a self-contained subframe may include at least a downlink control part, a gap period, and/or an uplink control part. A self-contained subframe may be referred as a special subframe, a hybrid subframe, a mixed subframe, an autonomous subframe, a switching subframe, a transition subframe, etc. A self-contained subframe may include a gap period in the subframe for downlink to uplink transition. It should be noted that if too many self-contained subframes or downlink to uplink transition points are used, extra overhead may be introduced and/or actual resource for data transmission may be reduced.

Some configurations of the systems and methods disclosed herein may operate in accordance with one or more of the following conditions. NR design may enable the possibility for corresponding acknowledgement reporting shortly (in the order of X microseconds ($\mu$s), for example) after the end of the downlink data transmission. Corresponding uplink data transmission may occur shortly (in the order of Y $\mu$s, for example) after reception of an uplink assignment. X and/or Y values in the order of a few tens of or hundreds of microseconds may be feasible. It should be noted that the condition(s) may depend on, for example, UE capability, UE category, and/or payload size, etc.

Other mechanisms and/or configurations in addition to fast/short corresponding acknowledgement may be utilized. For example, other mechanisms and/or configurations may be utilized to provide coverage or enable TDD-LTE (or TD-LTE) coexistence.

If the time utilized for gap duration for the corresponding downlink HARQ feedback and/or uplink data transmission is small, a self-contained subframe may provide immediate uplink feedback or transmission for a downlink transmission or downlink grant. Accordingly, a self-contained subframe may be beneficial to provide low latency for HARQ-ACK feedback and uplink transmission. For example, with ultra-reliable low latency communications (URLLC), it may be beneficial to have immediate feedback on the delivery of a packet. In some cases, not all services may require such fast response (in 5G enhanced mobile broadband (eMBB) applications, for example, the maximum throughput may be more important). Aggregated HARQ-ACK of multiple subframes may reduce the feedback overhead and enhance the system throughput.

Some examples of radio frame or superframe structure are given in accordance with the systems and methods disclosed herein. Potential uplink and/or downlink assignment approaches and/or feasible structure and configurations in NR are also described. For data transmissions and HARQ-ACK feedback, the systems and methods disclosed herein may operate in accordance with one or more of the following conditions.

In some implementations, one or more of the following may be supported for NR. From a UE perspective, HARQ ACK/NACK feedback for multiple downlink transmissions in time may be transmitted in one uplink data/control region. Some or all of the following timing relationships may be indicated to a UE dynamically by the L1 downlink signaling (potentially explicitly or implicitly, for example): a timing relationship between downlink data reception and corresponding acknowledgement and/or a timing relationship between uplink assignment and corresponding uplink data transmission. It should be noted that a default value, if any, for one or more timing relationships may or may not be utilized (e.g., defined). Additionally or alternatively, potential values for each timing relationship may be utilized considering, for example, UE processing capability, gap overhead and/or uplink coverage, etc. Other approaches for indicating the timing relationship may be utilized.

Some or all of the following timing relationships may be indicated to a UE semi-statically (potentially explicitly or implicitly, for example): a timing relationship between downlink data reception and corresponding acknowledgement and/or a timing relationship between uplink assignment and corresponding uplink data transmission. It should be noted that a default value for one or more timing relationships may or may not be utilized. Potential values for each timing relationship may be utilized considering, for example, UE processing capability, gap overhead and/or uplink coverage, etc. Other approaches for indicating the timing relationship may be utilized.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating an example of one or more base stations 160 and one or more UEs 102 in which systems and methods for determining radio frame structure and association timing may be implemented. The one or more UEs 102 communicate with one or more base stations 160 using one or more antennas 122*a-n*. For example, a UE 102 transmits electromagnetic signals to the base station 160 and receives electromagnetic signals from the base station 160 using the one or more antennas 122a-n. The base station 160 communicates with the UE 102 using one or more antennas 180a-n. Examples of the base station(s) 160 include Node Bs, eNBs, and gNBs.

The UE 102 and the base station 160 may use one or more channels 119, 121 to communicate with each other. For example, a UE 102 may transmit information or data to the base station 160 using one or more uplink channels 121. Examples of uplink channels 121 include a physical uplink control channel (PUCCH) and a physical uplink shared channel (PUSCH), etc. For example, PUCCH is used for UCI feedback, and PUSCH is used for UCI feedback and/or uplink data transmission. The one or more base stations 160 may also transmit information or data to the one or more UEs 102 using one or more downlink channels 119, for instance. Examples of downlink channels 119 include a PDCCH, a PDSCH, etc. Other kinds of channels may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the base station 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the base station 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. In some approaches, the UE-decoded signal 106 (or a variant thereof) may be provided to the data buffer via the UE operations module 124. For example, the UE operations module 124 may perform one or more operations on the UE-decoded signal 106 and may provide the UE-decoded signal 106 to the data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

As used herein, the term "module" may mean that a particular element or component may be implemented in hardware, software, firmware or a combination of hardware, software and/or firmware. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more base stations 160. The UE operations module 124 may include a UE radio frame structure determination module 126. The UE radio frame structure determination module 126 may operate in accordance with one or more of the functions, methods, procedures, approaches, cases, examples and/or techniques described herein. For example, the UE radio frame structure determination module 126 may operate in accordance with the description given in connection with one or more of FIGS. 2, 4-11 and/or 13.

The UE radio frame structure determination module 126 may determine a radio frame structure based on a self-contained subframe pattern. For example, the UE radio frame structure determination module 126 may utilize a self-contained subframe pattern to determine a structure of a radio frame. In some approaches, the base station 160 may indicate (e.g., configure) the self-contained subframe pattern (to the UE 102, for instance). For example, the base station 160 may transmit information (e.g., uplink-downlink configuration) used for configuring the pattern of a downlink only subframe, an uplink only subframe, and/or a self-contained subframe within a radio frame. For example, the self-contained subframe pattern may be indicated in broadcast information, in system information, or may be configured by higher layer signaling. Namely, the information (e.g., uplink-downlink configuration) may be included in broadcast information, system information, or higher layer signaling. In some approaches, a default self-contained subframe pattern may be used before an actual pattern is detected (e.g., a pattern with a single self-contained subframe in a radio frame). It should be noted that the self-contained subframe pattern may refer to the radio frame structure (e.g., the pattern of the downlink only subframe, the uplink only subframe, and/or the self-contained subframe). For example, the self-contained subframe pattern may not refer to the downlink and uplink allocation within a self-contained subframe. The UE radio frame structure determination module 126 may determine the radio frame structure based on the information (e.g., uplink-downlink configuration). Also, the actual pattern (the radio frame structure actually used for downlink transmissions and/or uplink transmissions) may be semi-statically configured and/or dynamically indicated.

The UE 102 may receive a downlink data assignment and decode downlink data. For example, the UE 102 (e.g., receiver 120) may receive a downlink data assignment from the base station 160 indicating a scheduled time (e.g., subframe, slot, etc.) to receive downlink data. The UE 102 may receive the downlink data according to the downlink data assignment. The UE 102 (e.g., decoder 108) may decode the downlink data.

The UE radio frame structure determination module 126 may determine a HARQ-ACK feedback timing of the downlink data. For example, the UE radio frame structure determination module 126 may determine a time (e.g., slot, subframe, etc.) when to send the HARQ-ACK feedback based on the received downlink data. The HARQ-ACK feedback timing may be based on the radio frame structure. The UE 102 (e.g., transmitter 158) may transmit the HARQ-ACK feedback of the downlink data based on (e.g., with) the determined HARQ-ACK feedback timing. The HARQ-ACK feedback timing may be based on the default radio frame structure in a case that no radio frame structure is configured/indicated. The HARQ-ACK feedback timing may be based on the actual radio frame structure in a case that the actual radio frame structure is configured/indicated.

The UE 102 (e.g., receiver 120) may receive uplink scheduling information. For example, the UE 102 may receive uplink scheduling information from the base station 160 indicating a time (e.g., slot, subframe, etc.) for transmitting uplink data.

The UE radio frame structure determination module 126 may determine an uplink scheduling timing for a scheduled uplink transmission. For example, the UE radio frame structure determination module 126 may determine the uplink scheduling timing (e.g., a slot, subframe, etc.) based on the uplink scheduling information. For instance, the uplink scheduling timing may indicate a scheduled subframe. In some approaches, the uplink scheduling timing may be based on the radio frame structure. The uplink scheduling timing may be based on the default radio frame structure in a case that no radio frame structure is configured/indicated. The uplink scheduling timing may be based on the actual radio frame structure in a case that the actual radio frame structure is configured/indicated.

The UE 102 (e.g., transmitter 158) may transmit uplink data in a scheduled subframe. For example, the UE 102 may transmit the uplink data to the base station 160 in a scheduled subframe.

In some approaches, the radio frame may include at least one self-contained subframe in the self-contained subframe pattern. As described herein, the self-contained subframe may include a downlink part, a gap period, and/or an uplink part.

In a radio frame structure, the self-contained subframes may provide some basic and fundamental functionality in some implementations. For example, self-contained subframes may provide synchronization. For instance, a primary synchronization signal and/or a secondary synchronization signal may be included in one or more of the self-contained subframes.

Self-contained subframes may provide physical random access. For example, the uplink part of the self-contained subframe may be used for UE initial access before the connected mode.

Self-contained subframes may provide default downlink data HARQ-ACK feedback. For instance, default downlink data HARQ-ACK may be provided in the uplink part of a self-contained subframe. If the uplink control part of a self-contained subframe is too small for HARQ-ACK feedback, or if more HARQ-ACK resources are needed, an uplink subframe may be allocated immediately after a self-contained subframe in some approaches, so that the default HARQ-ACK timing may be determined based on the uplink subframe immediately after a self-contained subframe.

The actual use of the other subframes between self-contained subframes may be semi-statically or dynamically allocated. Some principles for allocation may include one or more of the following. A downlink subframe may immediately follow a self-contained subframe, an uplink subframe or a downlink subframe. An uplink subframe may immediately follow a self-contained subframe or another subframe. A self-contained subframe may be inserted if more downlink to uplink switching is needed between two configured self-contained subframes.

In some approaches, the allocation may be semi-statically signaled by higher layer (e.g., radio resource control (RRC)) signaling. In some approaches, the subframe allocation after a self-contained subframe may be dynamically indicated by a DCI format in the self-contained subframe. The DCI may use a cell-specific radio network temporary identifier (RNTI) in the common search space. Thus, the allocation may be applied to all UEs associated with the cell. The DCI may use a UE-group RNTI or a UE-specific RNTI so that the allocation may be applied to a group of UEs or a single UE.

From a perspective of a UE, based on the actual subframe allocation, a UE may only need to monitor downlink control information in the downlink and self-contained subframes. If the self-contained subframe is configured at subframe 1 of each radio frame, legacy TDD uplink/downlink configurations may be used to define the actual subframe allocations. Moreover, if the uplink control part of a self-contained subframe is too small (e.g., having less capacity than a threshold, less time than a threshold, etc.), an uplink subframe may be allocated immediately after a self-contained subframe.

In some examples, the radio frame may have 10 subframes or a multiple of 10 subframes. For instance, a self-contained subframe may be configured every 2 subframes, every 5 subframes, every 10 subframes, or a multiple of 10 subframes. In other examples, the radio frame may have a power of 2 subframes (e.g., 8 subframes, 16 subframes, 32 subframes, etc.), and a self-contained subframe may be configured for every power of 2 subframes (e.g., 2, 4, 8, 16 subframes, etc.). In some implementations, the number of self-contained subframes may be at least less than half of the number of subframes in a radio frame. In some implementations, for example, the number of self-contained subframes may be half of or less than half of the number of subframes in a radio frame.

In some approaches, a subframe allocation of one or more other subframes besides the self-contained subframe pattern in a radio frame may be allocated semi-statically by higher layer signaling. For example, the UE 102 may receive higher layer signaling that indicates a subframe allocation besides the self-contained subframes. In some implementations, the subframe allocation of the one or more other subframes may be determined by the UE operations module 124 and/or the UE radio frame structure determination module 126.

In some approaches, a subframe allocation of one or more other subframes besides the self-contained subframe pattern in a radio frame may be allocated by layer 1 (L1) signaling from a self-contained subframe. For example, the UE 102 may receive layer 1 signaling in a self-contained subframe that indicates a subframe allocation besides the self-contained subframes. In some implementations, the subframe allocation of the one or more other subframes may be determined by the UE operations module 124 and/or the UE radio frame structure determination module 126.

In some approaches, HARQ-ACK feedback timing may be determined based on the radio frame structure. For example, the UE radio frame structure determination module 126 may determine HARQ-ACK feedback timing based on the radio frame structure. The HARQ-ACK feedback of the downlink data may be reported in an uplink part of an earliest self-contained subframe/slot (e.g., subframe and/or slot). For example, the uplink part of a first self-contained subframe after receiving the downlink data (or of a first self-contained subframe after a constraint (e.g., 4 transmission time intervals (TTIs)) may be used to transmit the HARQ-ACK feedback corresponding to the downlink data. Additionally or alternatively, the HARQ-ACK feedback may be reported in an uplink subframe/slot immediately after a self-contained subframe. If the uplink control part of a self-contained subframe is too small for HARQ-ACK feedback (e.g., has less capacity than the size of the HARQ-ACK feedback), or if more HARQ-ACK resources are needed, an uplink subframe may be allocated immediately after a self-contained subframe in some approaches, so that the default HARQ-ACK timing may be determined based on the uplink subframe immediately after a self-contained subframe.

In some approaches, HARQ-ACK feedback timing may be determined based on a DCI format. For example, the UE radio frame structure determination module 126 may determine HARQ-ACK feedback timing based on a DCI format. For instance, a downlink data assignment may use a short DCI format that contains no explicit timing information. The HARQ-ACK feedback of the downlink data may be reported (e.g., transmitted) with implicit timing in an uplink part of the earliest self-contained subframe. In another example, a downlink data assignment may use a long DCI format that contains explicit timing information. The HARQ-ACK feedback of the downlink data may be reported with explicit timing in an indicated uplink subframe or an uplink part of a self-contained subframe.

In some approaches, uplink scheduling timing may be determined based on a DCI format. For example, the UE radio frame structure determination module 126 may determine uplink scheduling timing based on a DCI format. For instance, uplink scheduling may use a short DCI format that contains no explicit timing information. The uplink data may be transmitted in an earliest uplink subframe or an uplink part of a self-contained subframe. In another example, uplink scheduling may use a long DCI format that contains explicit timing information. The uplink data may be transmitted in an explicitly indicated uplink subframe or an uplink part of a self-contained subframe.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the base station 160.

The UE operations module 124 may provide information 136 to the decoder 108. For example, the UE operations module 124 may inform the decoder 108 of an anticipated encoding for transmissions from the base station 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the base station 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the base station 160. For instance, the one or more transmitters 158 may transmit during an uplink subframe or an uplink part of a self-contained subframe. The one or more transmitters 158 may upconvert and transmit the modulated signal(s) 156 to one or more base stations 160.

The base station 160 may include one or more transceivers 176, one or more demodulators 172, one or more decoders 166, one or more encoders 109, one or more modulators 113, a data buffer 162 and a base station operations module 182. For example, one or more reception and/or transmission paths may be implemented in a base station 160. For convenience, only a single transceiver 176, decoder 166, demodulator 172, encoder 109 and modulator 113 are illustrated in the base station 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The base station 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., HARQ-ACK information) that may be used by the base station operations module 182 to perform one or more operations.

In general, the base station operations module 182 may enable the base station 160 to communicate with the one or more UEs 102. The base station operations module 182 may include a base station radio frame structure determination module 194. The base station radio frame structure determination module 194 may operate in accordance with one or more of the functions, methods, procedures, approaches, cases, examples and/or techniques described herein. For example, the base station radio frame structure determination module 194 may operate in accordance with the description given in connection with one or more of FIGS. 3-10, 12 and 14.

The base station radio frame structure determination module 194 may determine a radio frame structure based on a self-contained subframe pattern. For example, the base station radio frame structure determination module 194 may utilize a self-contained subframe pattern to determine a structure of a radio frame. In some approaches, the base station 160 may determine the self-contained subframe pattern and/or may indicate the self-contained subframe pattern to the UE 102.

The base station 160 may transmit a downlink data assignment and downlink data. For example, the base station 160 (e.g., transmitter 117) may transmit a downlink data assignment to the UE 102 indicating a scheduled time (e.g., subframe, slot, etc.) to receive downlink data. The base station 160 may transmit the downlink data according to the downlink data assignment. The base station 160 (e.g., encoder 109) may encode the downlink data.

The base station radio frame structure determination module 194 may determine a HARQ-ACK feedback timing of the downlink data. For example, the base station radio frame structure determination module 194 may determine a time (e.g., slot, subframe, etc.) when to receive the HARQ-ACK feedback based on the downlink data (e.g., the downlink data assignment). The HARQ-ACK feedback timing may be based on the radio frame structure. The base station 160 (e.g., receiver 178) may receive the HARQ-ACK feedback of the downlink data based on (e.g., with, according to, etc.) the determined HARQ-ACK feedback timing.

The base station 160 (e.g., transmitter 117) may transmit uplink scheduling information. For example, the base station 160 may transmit uplink scheduling information to the UE 102 indicating a time (e.g., slot, subframe, etc.) for transmitting uplink data.

The base station radio frame structure determination module 194 may determine an uplink scheduling timing for a scheduled uplink transmission. For example, the base station radio frame structure determination module 194 may determine the uplink scheduling timing (e.g., a slot, subframe, etc.) based on the uplink scheduling information. For instance, the uplink scheduling timing may indicate a scheduled subframe. In some approaches, the uplink scheduling timing may be based on the radio frame structure.

The base station 160 (e.g., receiver 178) may receive uplink data in a scheduled subframe. For example, the base station 160 may receive the uplink data from the UE 102 in a scheduled subframe.

The radio frame may have one or more of the attributes described herein. For example, the radio frame may include at least one self-contained subframe in the self-contained subframe pattern and/or may include a downlink part, a gap period, and an uplink part. The radio frame may have 10 subframes or a multiple of 10 subframes (with a self-contained subframe configured every 2 subframes, every 5 subframes, every 10 subframes, or a multiple of 10 subframes, etc., for example). Additionally or alternatively, the radio frame may have a power of 2 subframes (e.g., 8 subframes, 16 subframes, 32 subframes, etc.), and a self-contained subframe may be configured for every power of 2 subframes (e.g., 2, 4, 8, 16 subframes, etc.).

In some approaches, a subframe allocation of one or more other subframes besides the self-contained subframe pattern in a radio frame may be allocated semi-statically by higher layer signaling. For example, the base station 160 may transmit higher layer signaling that indicates a subframe allocation besides the self-contained subframes. In some implementations, the subframe allocation of the one or more other subframes may be determined by the base station radio frame structure determination module 194.

In some approaches, a subframe allocation of one or more other subframes besides the self-contained subframe pattern in a radio frame may be dynamically allocated by layer 1 (L1) signaling from a self-contained subframe. For example, the base station 160 may transmit layer 1 signaling in a self-contained subframe that indicates a subframe allocation besides the self-contained subframes. In some implementations, the subframe allocation of the one or more other subframes may be determined by the base station radio frame structure determination module 194.

In some approaches, HARQ-ACK feedback timing may be determined based on the radio frame structure. For example, the base station radio frame structure determination module 194 may determine HARQ-ACK feedback timing based on the radio frame structure. The HARQ-ACK feedback of the downlink data may be reported (e.g., received) in an uplink part of an earliest self-contained subframe/slot (e.g., subframe and/or slot). For example, the uplink part of a first self-contained subframe after transmitting the downlink data (or of a first self-contained subframe after a constraint (e.g., 4 TTIs) may be used to receive the HARQ-ACK feedback corresponding to the downlink data. Additionally or alternatively, the HARQ-ACK feedback may be reported in an uplink subframe/slot immediately after a self-contained subframe. If the uplink control part of a self-contained subframe is too small for HARQ-ACK feedback, or if more HARQ-ACK resources are needed, an uplink subframe may be allocated immediately after a self-contained subframe in some approaches, so that the default HARQ-ACK timing may be determined based on the uplink subframe immediately after a self-contained subframe. Examples of HARQ-ACK feedback timing are given in connection with FIGS. 7-9.

In some approaches, HARQ-ACK feedback timing may be determined based on a DCI format. For example, the base station radio frame structure determination module 194 may determine HARQ-ACK feedback timing based on a DCI format. For instance, a downlink data assignment may use a short DCI format that contains no explicit timing information. The HARQ-ACK feedback of the downlink data may be reported (e.g., received) with implicit timing in an uplink part of the earliest self-contained subframe. In another example, a downlink data assignment may use a long DCI format that contains explicit timing information. The HARQ-ACK feedback of the downlink data may be reported (e.g., received) with explicit timing in an indicated uplink subframe or an uplink part of a self-contained subframe.

In some approaches, uplink scheduling timing may be determined based on a DCI format. For example, the base station radio frame structure determination module 194 may determine uplink scheduling timing based on a DCI format. For instance, uplink scheduling may use a short DCI format that contains no explicit timing information. The uplink data may be received in an earliest uplink subframe or an uplink part of a self-contained subframe. In another example, uplink scheduling may use a long DCI format that contains explicit timing information. The uplink data may be received in an explicitly indicated uplink subframe or an uplink part of a self-contained subframe.

The base station operations module 182 may provide information 188 to the demodulator 172. For example, the base station operations module 182 may inform the demodulator 172 of a modulation pattern anticipated for transmissions from the UE(s) 102.

The base station operations module 182 may provide information 186 to the decoder 166. For example, the base station operations module 182 may inform the decoder 166 of an anticipated encoding for transmissions from the UE(s) 102.

The base station operations module 182 may provide information 101 to the encoder 109. The information 101 may include data to be encoded and/or instructions for encoding. For example, the base station operations module 182 may instruct the encoder 109 to encode information 101, including transmission data 105.

The encoder 109 may encode transmission data 105 and/or other information included in the information 101 provided by the base station operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The base station operations module 182 may provide information 103 to the modulator 113. This information 103 may include instructions for the modulator 113. For example, the base station operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The base station operations module 182 may provide information 192 to the one or more transmitters 117. This information 192 may include instructions for the one or more transmitters 117. For example, the base station operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a downlink subframe may be transmitted from the base station 160 to one or more UEs 102 and that an uplink subframe may be transmitted from one or more UEs 102 to the base station 160. Furthermore, both the base station 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
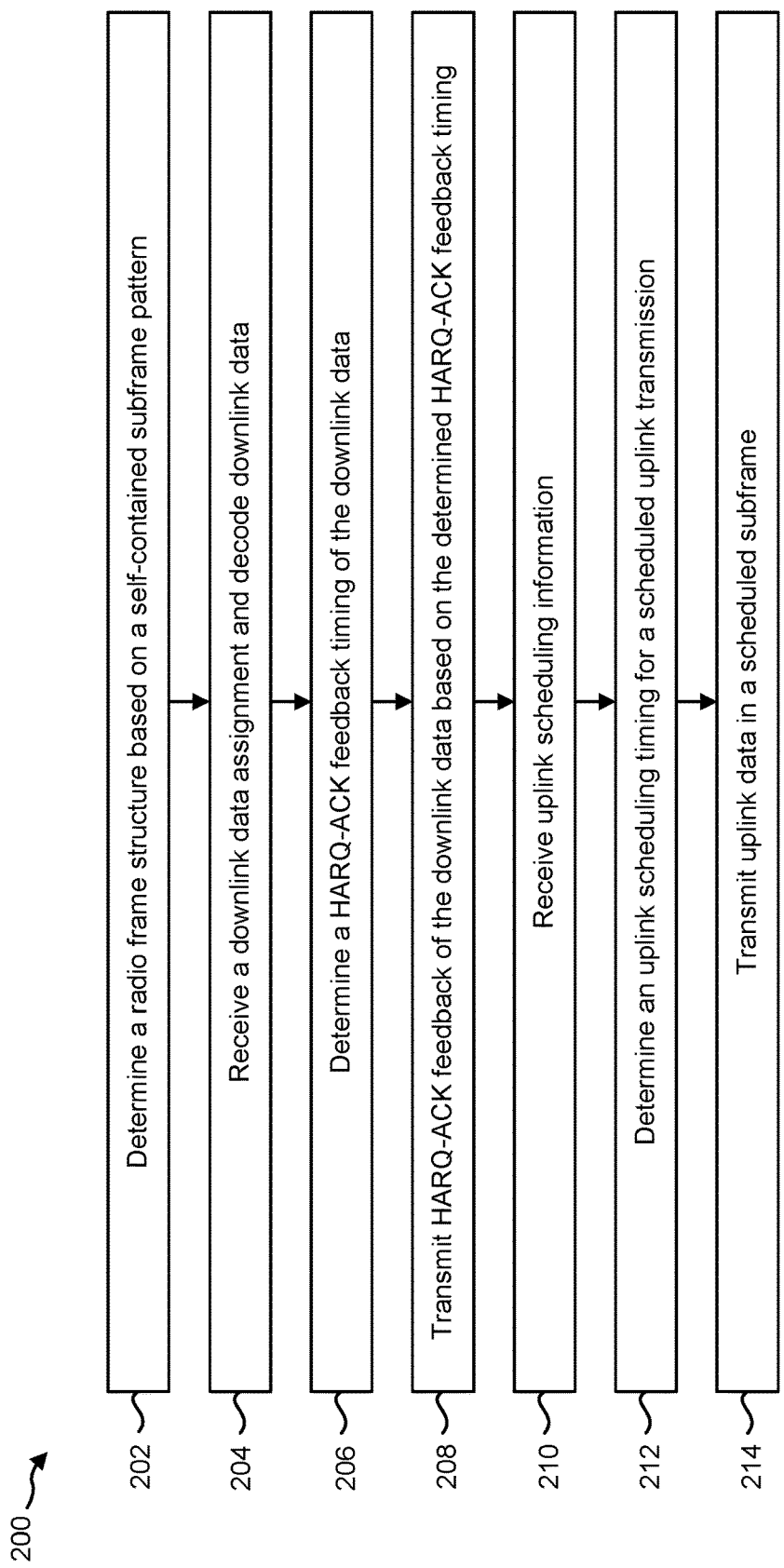
FIG. 2 is a flow diagram illustrating a method for determining frame structure and association timing.

FIG. 2 is a flow diagram illustrating a method 200 for determining frame structure and association timing. The method 200 may be performed by the UE 102 described in connection with FIG. 1. The UE 102 may determine 202 a radio frame structure based on a self-contained subframe pattern. In some implementations, this may be accomplished as described in connection with one or more of FIGS. 1, 4-6, and/or 8.

The UE 102 may receive 204 a downlink data assignment and decode downlink data. This may be accomplished as described in connection with FIG. 1. For example, the UE 102 may receive 204 a downlink data assignment from the base station 160 that indicates a time (e.g., slot, subframe, etc.) to receive downlink data transmitted by the base station 160. The UE 102 may receive the downlink data according to the downlink data assignment (e.g., at the time indicated by the downlink data assignment). The UE 102 may also decode the received downlink data.

The UE 102 may determine 206 a HARQ-ACK feedback timing of the downlink data. This may be accomplished as described in connection with FIG. 1. For example, the UE 102 may determine an association timing for transmitting HARQ-ACK feedback corresponding to the downlink data. In some implementations, the association timing may be determined as described in connection with one or more of FIGS. 7-9.

The UE 102 may transmit 208 HARQ-ACK feedback of the downlink data based on (e.g., with, according to, etc.) the determined HARQ-ACK feedback timing. This may be accomplished as described in connection with FIG. 1. For example, the UE 102 may determine the HARQ-ACK corresponding to the received downlink data. For instance, the UE 102 may generate HARQ-ACK feedback that indicates whether some or all of the downlink data was received correctly or incorrectly. The UE 102 may transmit 208 the HARQ-ACK feedback at the time indicated by the HARQ-ACK feedback timing.

The UE 102 may receive 210 uplink scheduling information. This may be accomplished as described in connection with FIG. 1. For example, the UE 102 may receive uplink scheduling information from the base station 160 indicating a time for transmitting uplink data.

The UE 102 may determine 212 an uplink scheduling timing for a scheduled uplink transmission. This may be accomplished as described in connection with FIG. 1. For example, the UE 102 may determine an association timing for transmitting uplink data based on the uplink scheduling information. In some implementations and/or cases, the UE 102 may determine 212 the uplink scheduling timing as described in connection with FIG. 10. The timing may be indicated implicitly or explicitly by the uplink scheduling information.

The UE 102 may transmit 214 uplink data in a scheduled subframe. This may be accomplished as described in connection with FIG. 1. For example, the UE 102 may transmit 214 the uplink data at a time indicated by the association timing for transmitting uplink data.

Figure 3:
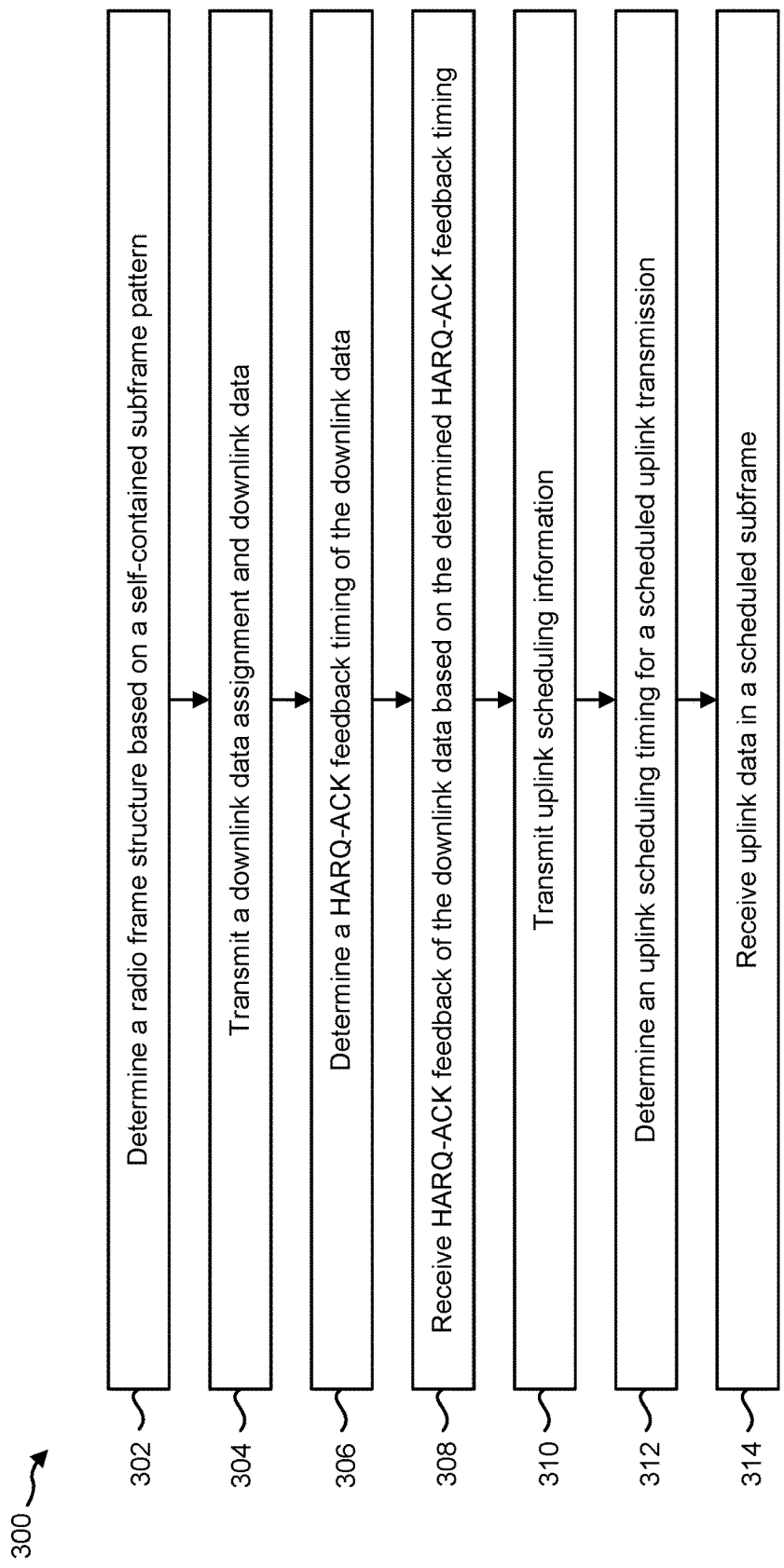
FIG. 3 is a flow diagram illustrating another method for determining frame structure and association timing.

FIG. 3 is a flow diagram illustrating another method 300 for determining frame structure and association timing. The method 300 may be performed by the base station 160 described in connection with FIG. 1. The base station 160 may determine 302 a radio frame structure based on a self-contained subframe pattern. In some implementations, this may be accomplished as described in connection with one or more of FIGS. 1, 4-6 and 8.

The base station 160 may transmit 304 a downlink data assignment and downlink data. This may be accomplished as described in connection with FIG. 1. For example, the base station 160 may transmit 304 a downlink data assignment to the UE 102 that indicates a time (e.g., slot, subframe, etc.) to receive downlink data transmitted by the base station 160. The base station 160 may transmit the downlink data according to the downlink data assignment (e.g., at the time indicated by the downlink data assignment). The base station 160 may also encode the downlink data before transmission.

The base station 160 may determine 306 a HARQ-ACK feedback timing of the downlink data. This may be accomplished as described in connection with FIG. 1. For example, the base station 160 may determine an association timing for receiving (e.g., for a UE to transmit) HARQ-ACK feedback corresponding to the downlink data. In some implementations, the association timing may be determined as described in connection with one or more of FIGS. 7-9.

The base station 160 may receive 308 HARQ-ACK feedback of the downlink data based on (e.g., with, according to, etc.) the determined HARQ-ACK feedback timing. This may be accomplished as described in connection with FIG. 1. For example, the base station 160 may receive 308 the HARQ-ACK feedback at the time indicated by the HARQ-ACK feedback timing.

The base station 160 may transmit 310 uplink scheduling information. This may be accomplished as described in connection with FIG. 1. For example, the base station 160 may transmit scheduling information to the UE 102 indicating a time for transmitting uplink data.

The base station 160 may determine 312 an uplink scheduling timing for a scheduled uplink transmission. This may be accomplished as described in connection with FIG. 1. For example, the base station 160 may determine an association timing for the UE 102 to transmit uplink data based on the uplink scheduling information. In some implementations and/or cases, the base station 160 may determine 312 the uplink scheduling timing as described in connection with FIG. 10. The timing may be indicated implicitly or explicitly by the uplink scheduling information.

The base station 160 may receive 314 uplink data in a scheduled subframe. This may be accomplished as described in connection with FIG. 1. For example, the base station 160 may receive 314 the uplink data at a time indicated by the association timing for receiving uplink data.

Figure 4:
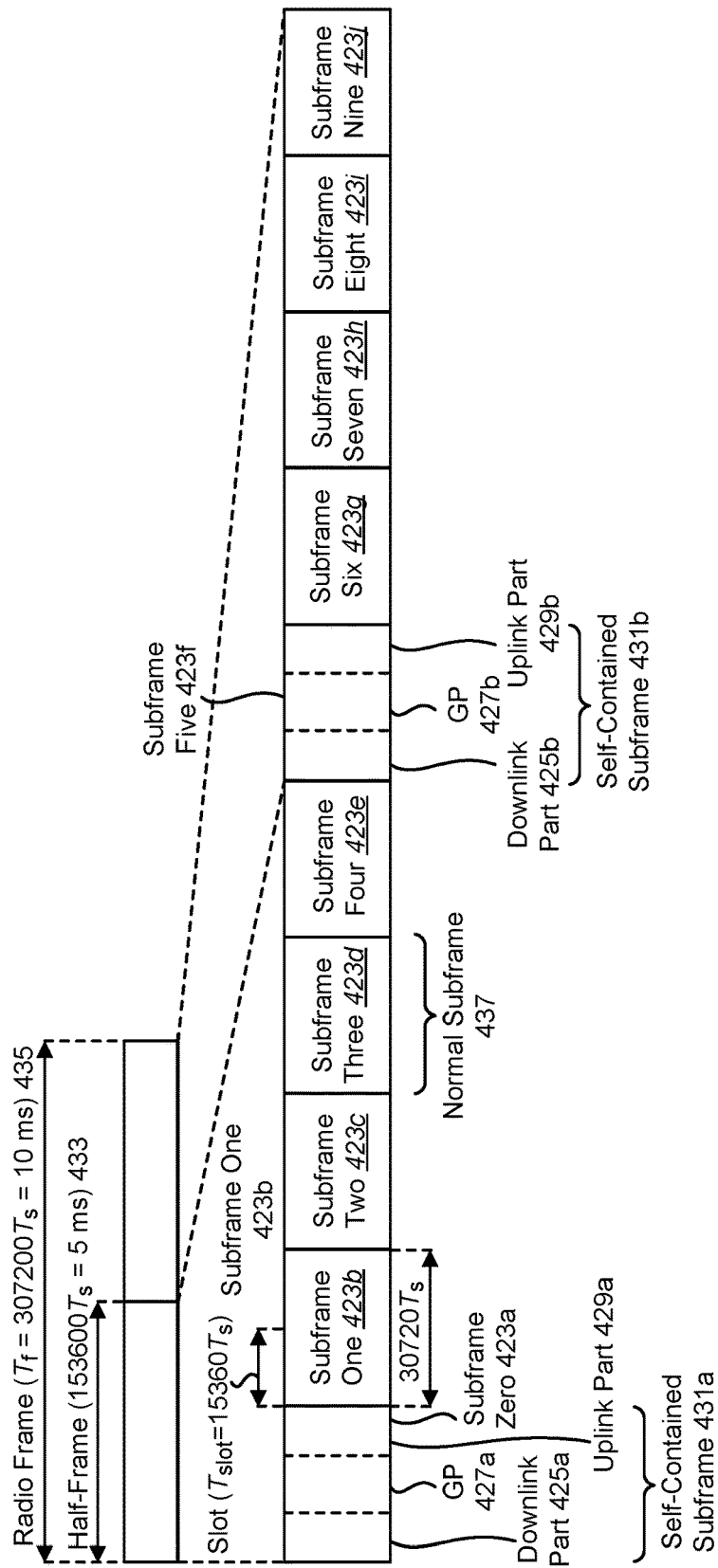
FIG. 4 is a diagram illustrating one example of a radio frame that may be used in accordance with the systems and methods disclosed herein.

FIG. 4 is a diagram illustrating one example of a radio frame 435 that may be used in accordance with the systems and methods disclosed herein. This radio frame 435 structure may provide a frame structure for TDD. While some specific values are given in connection with FIG. 4, it should be noted that different values (e.g., time lengths, etc.) may be implemented. Each radio frame 435 may have a length of $T_f = 307200 \cdot T_s = 10$ ms, where $T_f$ is a radio frame 435 duration and $T_s$ is a time unit equal to $$\frac{1}{(15000 \times 2048)} \text{ seconds.}$$

seconds. The radio frame 435 may include two half-frames 433, each having a length of $153600 \cdot T_s = 5$ ms. Each half-frame 433 may include five subframes 423a-e, 423f-j each having a length of $30720 \cdot T_s = 1$ ms. The values provided in connection with FIG. 4 may be examples using a subcarrier spacing of 15 kilohertz (kHz). In new RAT (NR), additional or alternative (e.g., different) numerologies may be supported. For example, the subcarrier spacing may be defined by power of 2 of a reference subcarrier spacing. For instance, for a reference subcarrier spacing of f with a symbol length of 1, different subcarrier spacing of $2^n * f$ may be supported with a corresponding symbol length of $1/2^n$. The symbols of different numerologies may be aligned at the subframe level. In NR, one or more of the following subcarrier spacing values may be supported or considered: 3.75 kHz, 7.5 kHz, 15 kHz, 30 kHz, 60 kHz, 120 kHz, 240 kHz, and 480 kHz. The subframe and radio frame lengths may be scaled accordingly based on the subcarrier spacing and symbol lengths.

In accordance with the systems and methods disclosed herein, some types of subframes 423 that may be used include a downlink subframe, an uplink subframe and a self-contained subframe 431. In the example illustrated in FIG. 4, two self-contained subframes 431a-b are included in the radio frame 435. The remaining subframes 423 are normal subframes 437.

The first self-contained subframe 431a includes a downlink part 425a, a gap period (GP) 427a and an uplink part 429a. In this example, the first self-contained subframe 431a is included in subframe zero 423a. The second self-contained subframe 431b includes a downlink part 425b, a gap period (GP) 427b and an uplink part 429b. In this example, the second self-contained subframe 431b is included in subframe five 423f.

Each subframe i 423a-j (where i denotes a subframe ranging from subframe zero 423a (e.g., 0) to subframe nine 423j (e.g., 9) in this example) may be defined as two slots, 2i and 2i+1 of length $T_{slot} = 15360 \cdot T_s = 0.5$ ms in each subframe 423. For example, subframe one (e.g., 1) 423b may include two slots, including a first slot. Normal subframes 437 (e.g., subframes 423b-e, g-j) may be configured as one or more uplink subframes and/or downlink subframes.

Figure 5:
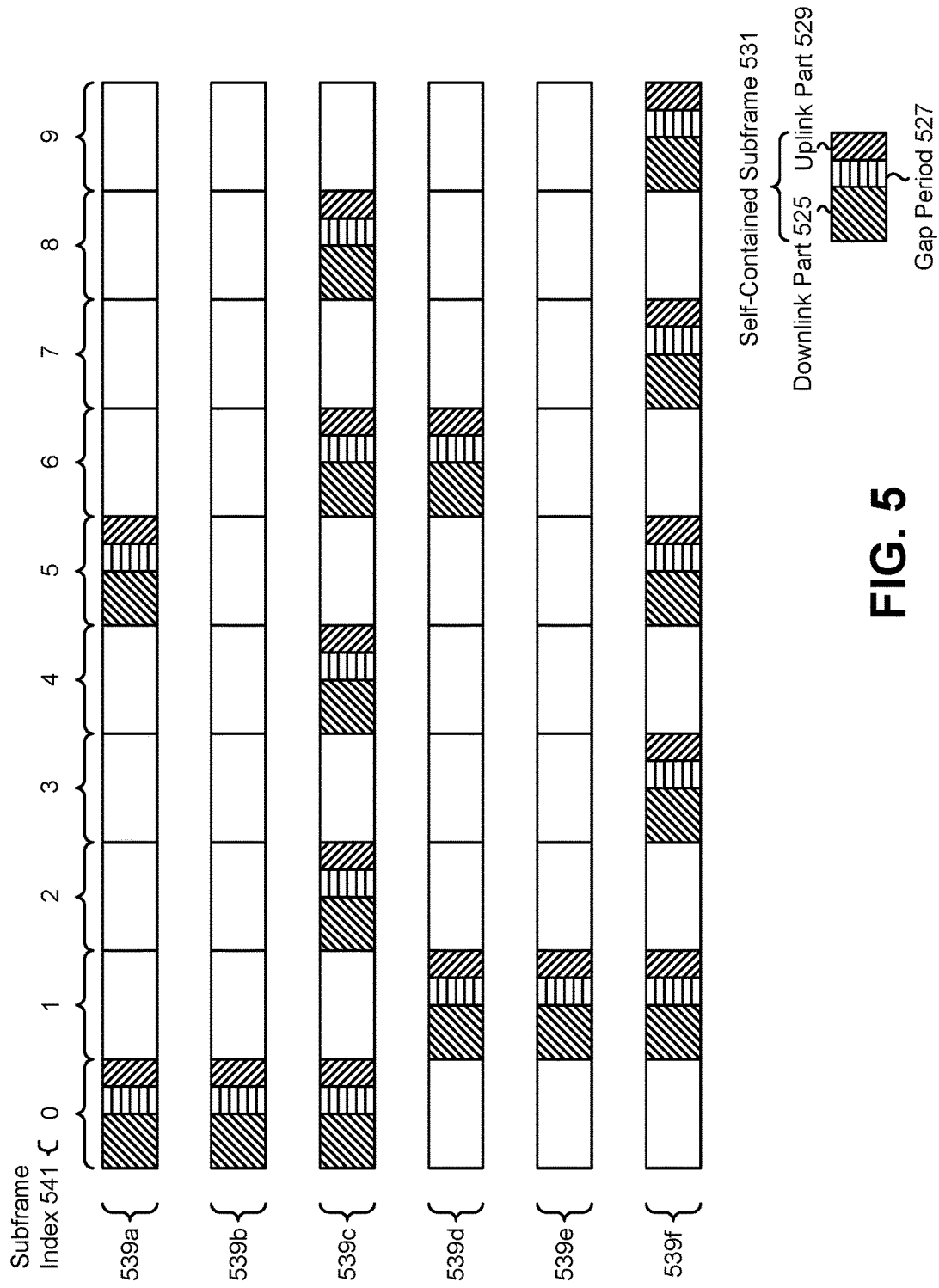
FIG. 5 is a diagram illustrating examples of radio frame structures based on self-contained subframes.

FIG. 5 is a diagram illustrating examples of radio frame structures based on self-contained subframes 531. A subframe index 541 is also illustrated. In some implementations, the radio frames structures illustrated in FIG. 5 may be implemented for NR radio frame structures.

In some implementations (e.g., NR), especially for high frequency carriers, a TDD approach may be beneficial. Multiple numerologies may be supported (in NR, for example) with different subcarrier spacings and symbol lengths. For a given numerology with a given subcarrier spacing and symbol length, the subframe length may be determined.

As illustrated in FIG. 5, a self-contained subframe 531 may include a downlink part 525, a gap period 527, and an uplink part 529. For a TDD approach (e.g., TDD network) with synchronized transmissions, the gap period 527 (or guard interval) may be utilized to switch from a downlink to uplink transmission. To reduce overhead, the number of downlink to uplink switch transitions may be reduced (e.g., minimized). Thus, a radio frame or superframe structure may be defined by including at least one downlink to uplink switching point in a radio frame. A self-contained subframe 531 may be used to provide the downlink to uplink switching. Thus, a radio frame or superframe (in NR, for example) may be defined as an interval of multiple subframes that includes at least one self-contained subframe 531.

In some approaches, a radio frame can be defined as 10 subframes for all numerologies. In another approaches, a radio frame can be defined as a factor of 10 subframes for different numerologies.

FIG. 5 shows several subframe allocations based on a radio frame of 10 subframes. In particular, FIG. 5 illustrates examples A-F 539a-f of radio frames with corresponding subframe allocations. A self-contained subframe 531 may appear every 5, 10 or 2 subframes as illustrated in FIG. 5. In one alternative, a self-contained subframe 531 may exist periodically starting in subframe 0 as illustrated in examples A-C 539a-c. In another alternative, a self-contained subframe 531 may exist periodically starting in subframe 1 as illustrated by examples D-F 539e-f. Examples D-F 539d-f may provide good co-existence with existing TDD networks if NR operates on an existing TDD band, because subframe 1 may be a special subframe in a TDD configuration. In some approaches, a special subframe may have similar structure and functionalities as a self-contained subframe in NR.

The subframe length may be different for different numerologies. In one approach, a radio frame for a given numerology may be defined with the same number of subframes. In another approach, a radio frame for a given numerology may be defined as a given interval (e.g., 10 milliseconds (ms), 5 ms, etc.). Thus, a radio frame may include different numbers of subframes for different numerologies. Therefore, a radio frame may include 20 subframes or 40 subframes, etc. Correspondingly, a self-contained subframe may appear every 10 subframes, 20 subframes, or 40 subframes, etc.

Figure 6:
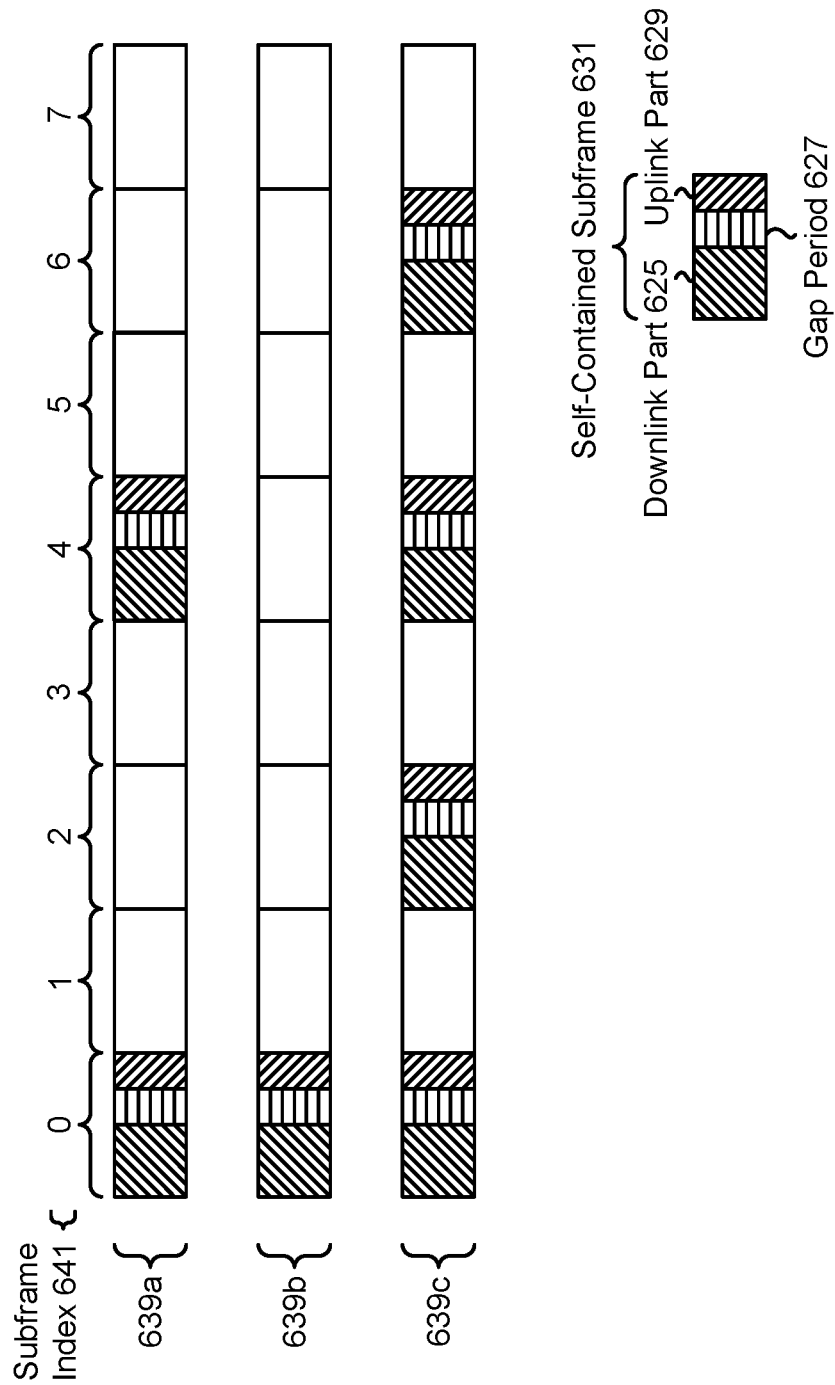
FIG. 6 is a diagram illustrating examples of radio frames in the order of $2^n$ subframes.

FIG. 6 is a diagram illustrating examples A-C 639a-c of radio frames in the order of $2^n$ subframes. A subframe index 641 is also illustrated. As illustrated in FIG. 6, a self-contained subframe 631 may include a downlink part 625, a gap period 627, and an uplink part 629. Due to the scalable numerology of an exponential scaling of a subcarrier spacing of $2^n*f$ (where f is a base subcarrier spacing, the lengths of symbols of different numerologies are given by $1/2^n$ and where l is the symbol length of the base subcarrier spacing), the symbols of different numerologies may be aligned at the subframe level.

In some approaches, a radio frame or superframe may be defined with exponential scaling in the subcarrier spacing to facilitate different numerology operations. Therefore, a radio frame may include $2^n$ subframes, where n is a positive integer number. A radio frame may include at least one self-contained subframe 631. A self-contained subframe 631 may be repeated every $2^k$ subframes, where $1 \leq k \leq n$. FIG. 6 illustrates examples A-C 639a-c of radio frames that include 8 subframes. In examples A-C 639a-c, a self-contained subframe 631 may be repeated every 4 subframes, 8 subframes and 2 subframes, respectively.

The location of the self-contained subframe may be shifted with an offset. For example, a self-contained subframe may exist periodically starting in subframe 1 to provide good co-existence with existing TDD networks if NR operates on an existing TDD band, because subframe 1 may be a special subframe in a TDD configuration. A special subframe may have similar structure and functionalities as a self-contained subframe in NR.

Figure 7:
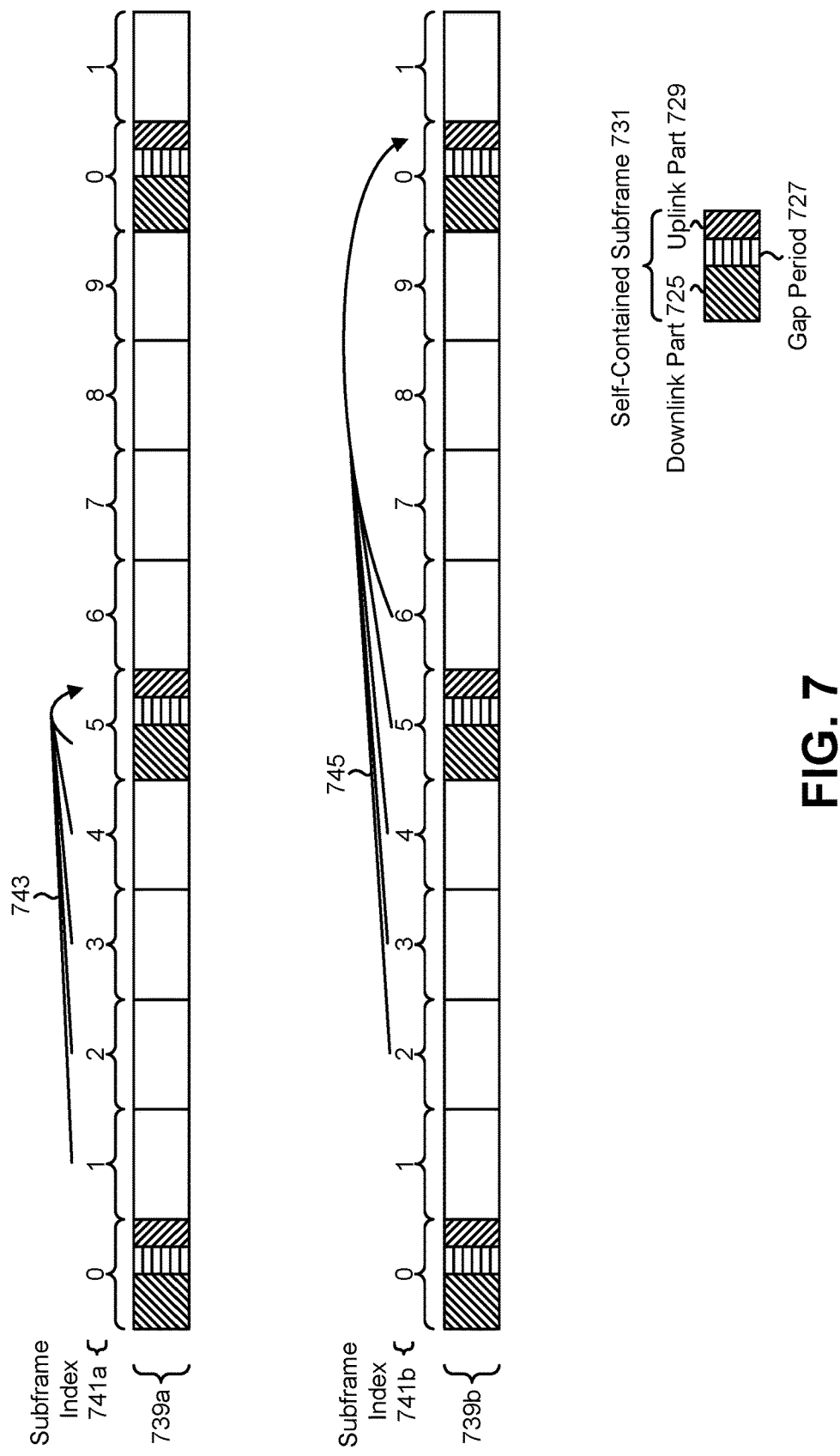
FIG. 7 is a diagram illustrating examples of implicit downlink hybrid automatic repeat request acknowledgement/negative acknowledgement (HARQ-ACK) feedback timing associations.

FIG. 7 is a diagram illustrating examples of implicit downlink HARQ-ACK feedback timing associations. In particular, FIG. 7 illustrates examples A-B 739a-b. Subframe indexes A-B 741a-b are also illustrated. As illustrated in FIG. 7, a self-contained subframe 731 may include a downlink part 725, a gap period 727, and an uplink part 729. In some implementations, the HARQ-ACK feedback timing described in connection with FIG. 7 may be implemented in NR.

Some implementations of the systems and methods disclosed herein (for NR, for example) may operate in accordance with one or more of the following conditions. From a UE perspective, HARQ ACK/NACK feedback for multiple downlink transmissions in time may be transmitted in one uplink data/control region.

Some or all of the following timing relationships may be indicated (potentially explicitly or implicitly, for example) to a UE dynamically by L1 downlink signaling. A timing relationship between downlink data reception and corresponding acknowledgement may be utilized. A timing relationship between uplink assignment and corresponding uplink data transmission may be utilized. In some implementations and/or cases, a default value for each timing relationship may be utilized. Potential values for each timing relationship may be based on UE processing capability, gap overhead, and/or uplink coverage, etc. Other approaches of indicating the timing relationship may not be precluded.

Some or all of the following timing relationships may be indicated to a UE semi-statically (potentially explicitly or implicitly, for example). A timing relationship between downlink data reception and corresponding acknowledgement may be indicated. A timing relationship between uplink assignment and corresponding uplink data transmission may be indicated. In some implementations and/or cases, a default value for each timing relationship is may be utilized. Potential values for each timing relationship may be based on UE processing capability, gap overhead, and/or uplink coverage, etc. Other approaches of indicating the timing relationship may not be precluded. These conditions indicate potential ways for downlink and uplink timing. The systems and methods disclosed herein may provide detailed solutions for timing relationships (e.g., timing associations) based on the radio frame structure.

Some approaches for downlink HARQ-ACK feedback timing are given as follows. If dynamic HARQ-ACK timing is indicated by L1 signaling, in the DCI format, the timing may be indicated on at least the number of transmission time intervals (TTIs) after the downlink data to report the HARQ-ACK. If continuous downlink transmissions are scheduled, the number of TTIs indicated in each downlink data may be different. Furthermore, the scheduler (e.g., the base station, eNB or gNB, etc.), may know that the indicated subframe is an uplink subframe or contains an uplink portion for HARQ-ACK feedback. Thus, the L1 signaling may be complicated and mixed together with subframe allocation signaling.

If a radio frame is defined with a self-contained subframe pattern, the uplink parts in the self-contained subframes may be the only fixed uplink parts. Thus, a default HARQ-ACK timing may be implicitly determined by the self-contained subframe pattern in a radio frame or a superframe. For example, the downlink HARQ-ACK timing may be be implicitly determined by the radio frame configuration. In some approaches, the HARQ-ACK of a downlink data may be reported in an uplink part of the earliest available self-contained subframe.

If the gap period or guard duration in a self-contained subframe is enough for a corresponding uplink feedback for data transmission (for NR, for example), a self-contained subframe may be an anchor subframe for downlink HARQ-ACK feedback of all subframes after the previous self-contained subframe. For some applications, more processing time may be needed. Thus, the HARQ-ACK timing may be adjusted based on the processing time restrictions. FIG. 7 shows examples A-B 739a-b with 2 self-contained subframes per radio frame, where each radio frame includes 10 subframes.

In some approaches, the HARQ-ACK of all downlink transmissions may be reported in the earliest uplink part of a self-contained subframe (as illustrated by example A 739a). In example A 739a, the HARQ-ACK is reported immediately after the gap period of a self-contained subframe as indicated by the HARQ-ACK timing associations 743. For instance, HARQ-ACK for downlink transmissions in subframes 1, 2, 3, 4 and/or the downlink part of subframe 5 may be reported (e.g., transmitted and/or received) in the uplink part of subframe 5.

In some approaches, the HARQ-ACK of all downlink transmissions may be reported in the earliest uplink part of a self-contained subframe based on processing time restrictions. This may be illustrated by example B 739b, where 4 TTIs (or another number of one or more TTIs) are required between the downlink subframe and the corresponding HARQ-ACK reporting. In example B 739b, more processing time (4 TTIs in this example) is needed. Thus, a different subframe set is formed for the HARQ-ACK feedback in the uplink part of a self-contained subframe, as illustrated by the HARQ-ACK timing associations 745. For instance, the HARQ-ACK corresponding to the downlink data in subframe 2 may be reported in the earliest self-contained subframe uplink part that is at least 4 TTIs after subframe 2.

It should be noted that the implicit downlink HARQ-ACK timing may be applied regardless of the actual allocation of one or more other subframes in a radio frame. For example, if a subframe is configured as uplink, no HARQ-ACK may be reported for that subframe, but the HARQ-ACK association may be maintained. Accordingly, HARQ-ACK bits may be generated and reported on an uplink channel. If the uplink control part of a self-contained subframe is too small for HARQ-ACK feedback, or if more HARQ-ACK resources are needed, an uplink subframe may be allocated immediately after a self-contained subframe in some approaches, so that the default HARQ-ACK timing may be determined based on the uplink subframe immediately after a self-contained subframe.

The implicit downlink HARQ-ACK may be viewed as a semi-static timing based on the semi-static configured radio frame structure. However, there are several potential issues with fixed timing. For certain applications, such as ultra-reliable low latency communications (URLLC) for example, a fast feedback is preferred. The fixed HARQ-ACK timing may not satisfy the requirement. In an uplink part of a self-contained subframe, for example, the resources for HARQ-ACK feedback may be limited. Therefore, it may be beneficial to offload HARQ-ACK feedback to other subframes in some cases. Thus, dynamic and explicit HARQ-ACK feedback may also be supported to provide faster feedback and offloading in some cases.

In some approaches, the HARQ-ACK timing may be modified based on the subframe allocation signaling. If a self-contained subframe is inserted between self-contained subframes configured for radio frame structure, a new timing may be applied to report HARQ-ACK to the earliest uplink part of the self-contained subframes. The indication of a new self-contained subframe may be part of the subframe allocation signaled as described above. The allocation may be semi-statically signaled by higher layer (e.g., RRC) signaling. The subframe allocation after a self-contained subframe may be dynamically indicated by a DCI format in the self-contained subframe.

Figure 8:
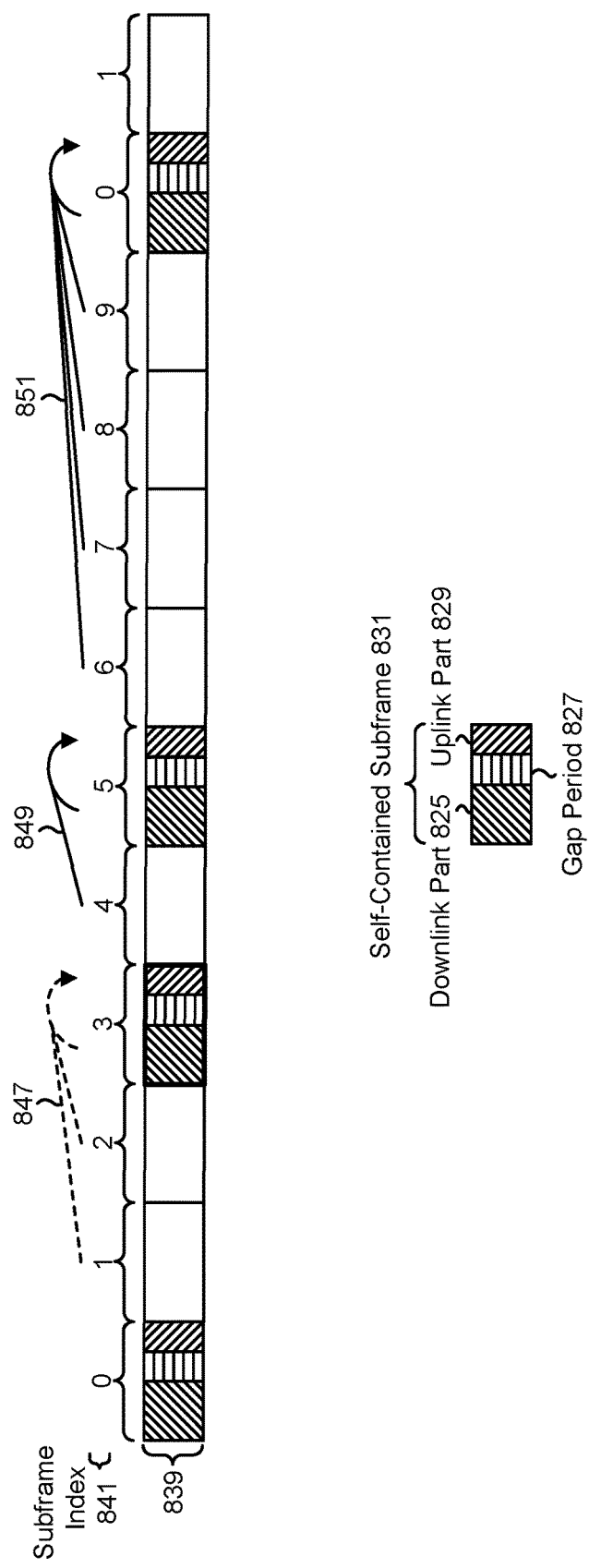
FIG. 8 is a diagram illustrating an example of inserting a new self-contained subframe, which may automatically modify the HARQ-ACK timing.

FIG. 8 is a diagram illustrating an example of inserting a new self-contained subframe, which may automatically modify the HARQ-ACK timing. In particular, FIG. 8 illustrates an example 839 of a set of subframes. A subframe index 841 is also illustrated. As illustrated in FIG. 8, a self-contained subframe 831 may include a downlink part 825, a gap period 827, and an uplink part 829. More specifically, FIG. 8 illustrates an example 839 where the cell is configured with a self-contained subframe every 5 subframes. If a new self-contained subframe is allocated between existing self-contained subframes (e.g., at subframe 3), new HARQ-ACK timing 847 may be applied to reduce the feedback latency. In particular, the example 839 illustrates regular HARQ-ACK timing associations 849, 851 and new HARQ-ACK timing associations 847 that may be utilized with the insertion of a new self-contained subframe at subframe 3.

If the HARQ-ACK timing is based only on the subframe allocation information, no extra HARQ-ACK timing information may be needed in the DCI format for downlink data scheduling. On the other hand, not all UEs may require fast HARQ-ACK feedback, and/or not all applications may require fast HARQ-ACK feedback. Thus, for some UEs and/or for some applications, the default HARQ-ACK timing may be kept unchanged regardless of the subframe allocation between configured self-contained subframes in a radio frame.

Therefore, in some approaches, the adaptive fast HARQ-ACK feedback may be application dependent. For example, if the downlink data is for URLLC traffic, fast HARQ-ACK feedback timing may be applied. If the downlink data is for eMBB or massive machine type communications (mMTC), the UE may maintain the default HARQ-ACK timing.

In another approach, the fast HARQ-ACK feedback may be explicitly indicated in the downlink data assignment DCI to override the default HARQ-ACK timing. New bits may be added to the DCI format to indicate the number of subframes to the subframe for HARQ-ACK feedback.

In some approaches, explicit HARQ-ACK feedback may be applied for HARQ-ACK offloading to other subframes. This may reduce the load on HARQ-ACK resources, and may reduce the potential feedback collision. Furthermore, an allocated uplink subframe may contain more HARQ-ACK feedback resources (e.g., PUCCH) resources, and/or support higher payload HARQ-ACK reports (e.g., different PUCCH formats than that of a self-contained subframe). Postponing the HARQ-ACK feedback to a later uplink subframe may provide more efficient use of resources (e.g., using HARQ-ACK multiplexing on a PUSCH transmission). The new timing may be explicitly indicated in the downlink data assignment DCI to override the default HARQ-ACK timing. Thus, new bits may be added to the DCI format to indicate the number of subframes to the subframe for HARQ-ACK feedback.

Figure 9:
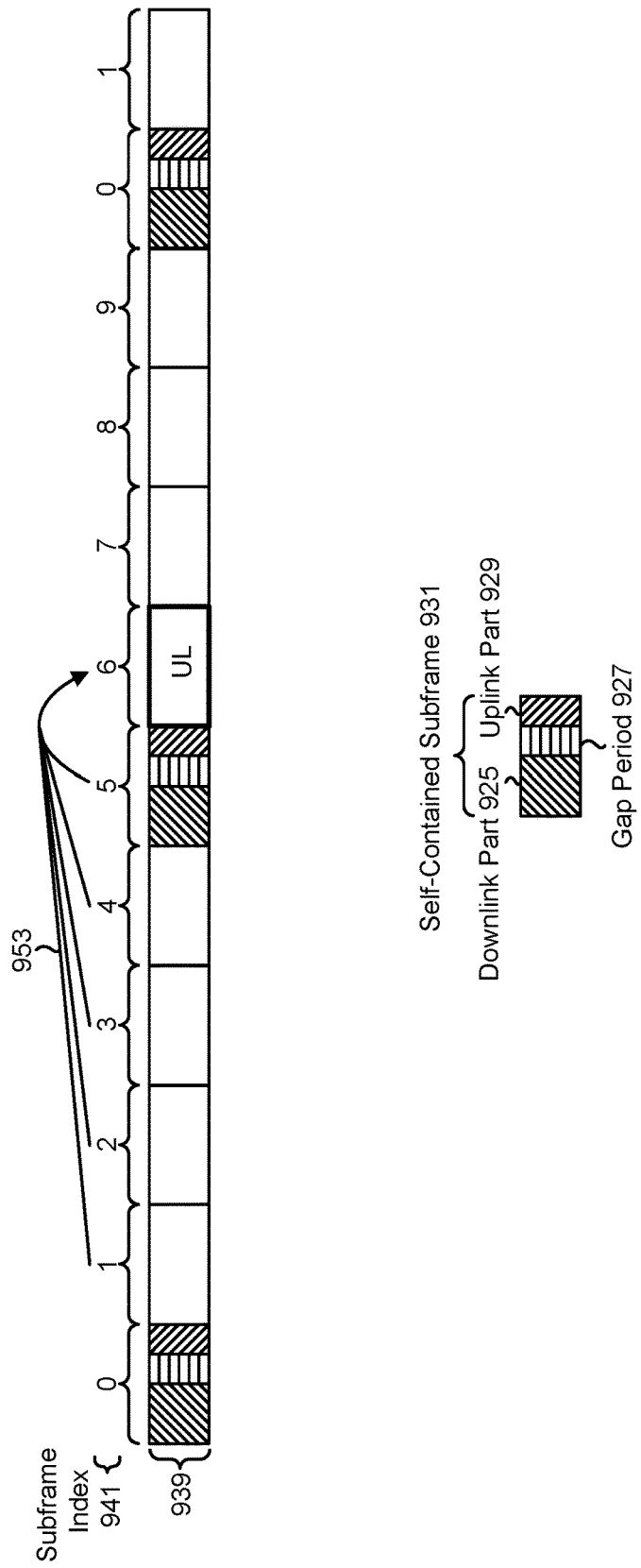
FIG. 9 is a diagram illustrating an example of explicit HARQ-ACK timing for offloading to a later uplink or self-contained subframe.

FIG. 9 is a diagram illustrating an example of explicit HARQ-ACK timing for offloading to a later uplink or self-contained subframe. In particular, FIG. 9 illustrates an example 939 of a set of subframes. A subframe index 941 is also illustrated. As illustrated in FIG. 9, a self-contained subframe 931 may include a downlink part 925, a gap period 927, and an uplink part 929. In some approaches, the HARQ-ACK of some or all downlink transmissions may be offloaded to one or more other uplink (UL) or self-contained subframes by explicit signaling.

If an uplink subframe is configured immediately after a self-contained subframe, the base station (e.g., eNB, gNB, etc.) may configure a default or implicit HARQ-ACK timing to the uplink subframe instead of the self-contained subframe. In this case, if a short DCI format is used without explicit timing information, the HARQ-ACK of a downlink data may be reported in the uplink subframe instead of the uplink control part of a self-contained subframe. If a long DCI format with explicit timing information is utilized, the subframe with the indicated timing may be used for HARQ-ACK reporting. As illustrated in FIG. 9, subframe 6 may be an uplink subframe following a self-contained subframe. The HARQ-ACK association timing 953 may be configured to indicate the uplink subframe instead of the uplink part of the self-contained subframe in subframe 5. It should be noted that if there are multiple downlink data scheduled for a given UE between two self-contained subframes, the UE may expect the same DCI format to be used in all downlink data assignments in some approaches.

In accordance with some implementations of the systems and methods disclosed herein, downlink HARQ-ACK feedback timing may be utilized in accordance with one or more of the following aspects. Implicit HARQ-ACK timing may be determined based on the configured self-contained subframes in a radio frame structure. Dynamic HARQ-ACK timing may be applied based on semi-static or dynamic subframe allocation between self-contained subframes. The dynamic timing may be application and/or traffic type dependent. The dynamic timing may be explicitly indicated by L1 signaling. Explicit L1 signaling may offload or re-direct the HARQ-ACK to a later uplink subframe or a self-contained subframe.

Figure 10:
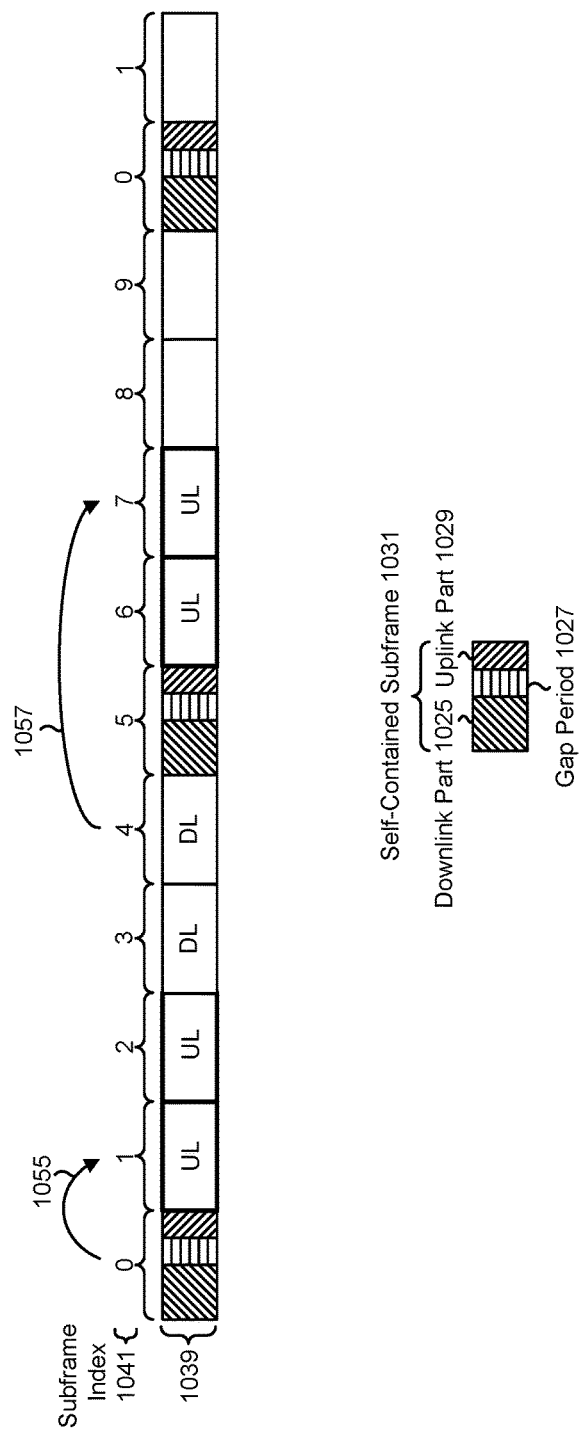
FIG. 10 is a diagram illustrating some examples of uplink scheduling.

FIG. 10 is a diagram illustrating some examples 1055, 1057 of uplink scheduling (e.g., uplink scheduling timing). For flexible uplink and downlink allocation (for NR, for example) explicit uplink scheduling timing may be supported. In a self-contained subframe configured for radio frame structure, the uplink part may be reserved for uplink control information (e.g., HARQ-ACK feedback). Thus, no uplink data may be scheduled in the uplink part. However, in other subframes, uplink data may be scheduled in a subframe that is allocated as an uplink subframe or a self-contained subframe.

In some approaches, a downlink control part may be included in every self-contained subframe, and an uplink subframe may always occur after a self-contained subframe. Thus, the downlink control part of a self-contained subframe may be used to schedule all uplink transmissions before the next self-contained subframe. Thus, in some approaches, the uplink grant may be only issued in self-contained subframes, and the UE may only need to monitor uplink grants in self-contained subframes.

In other approaches, the uplink grant may be signaled in a downlink control region of any downlink subframe or self-contained subframe. The DCI formats for uplink grant may have different formats. With a short DCI format, no scheduling timing information may be included, and the uplink data may be transmitted in the earliest uplink subframe after the uplink grant. In a self-contained subframe with mainly uplink allocation, an uplink grant without explicit timing information may schedule an uplink transmission in the uplink part of the self-contained subframe. This may be viewed as an implicit uplink scheduling method.

With a long DCI format, additional uplink scheduling timing information may be included. This explicit uplink scheduling DCI may be used if there are multiple consecutive uplink subframes. Some indication may be used in the DCI to indicate which uplink subframe is scheduled. The indication can be a subframe index number, or a subframe offset number, or the total number of subframes between the uplink grant and the uplink transmission.

The long DCI format (e.g., explicit uplink DCI format) may be used to postpone the transmission to a later uplink subframe in some approaches. For example, if the earliest uplink subframe or uplink part of a self-contained subframe is used for UCI reporting, the base station may avoid scheduling uplink data in the same subframe and postpone it to a later uplink subframe.

In another case, the short DCI format may schedule an uplink data transmission in the earliest uplink only subframe. And the long DCI format may be used to schedule the uplink data transmission in the uplink data part of a self-contained subframe.

In particular, FIG. 10 illustrates an example 1039 of a set of subframes and examples 1055, 1057 of uplink scheduling (e.g., uplink scheduling timing). A subframe index 1041 is also illustrated. As illustrated in FIG. 10, a self-contained subframe 1031 may include a downlink part 1025, a gap period 1027, and an uplink part 1029.

In the first example 1055 of uplink scheduling, the uplink grant may be issued in (e.g., from) a self-contained subframe with implicit timing for the earliest uplink subframe after the uplink grant. In the second example 1057 of uplink scheduling, an uplink grant is issued by (e.g., from) a downlink subframe with explicit scheduling timing to indicate the scheduling timing (e.g., uplink subframe) for the scheduled transmission.

It should be noted that some approaches of the systems and methods disclosed herein may be implemented in a frequency division duplexing (FDD) case. If a network (e.g., a NR network) has a paired spectrum (e.g., a FDD NR network), similar concepts can be applied. For example, an NR FDD radio frame structure may be defined based on a configuration of anchor uplink subframes. A radio frame may include at least one configured anchor uplink subframe. The anchor uplink subframe may be configured every 2, 5 or 10 subframes. For different numerologies, the anchor uplink subframe may be configured every 20 subframes, 40 subframes, etc.

An anchor uplink subframe may be allocated with all symbols in the given uplink subframe, or an anchor uplink subframe may be allocated with only a part of all symbols in the given uplink subframe. The anchor uplink subframe may be used to determine the default downlink HARQ-ACK feedback. The anchor uplink subframe may be used for UE initial access before the connected mode.

The anchor uplink subframe pattern may be fixed or shifted with an offset value. To distribute a PUCCH load, different UEs or a group of UEs may be configured with an anchor subframe pattern with different offset values.

The anchor uplink subframe may be used to determine the default downlink HARQ-ACK feedback. The use of anchor uplink subframe may allow HARQ-ACK aggregation of multiple downlink subframes, thus reducing the need of multiple HARQ-ACK reporting instances from a single UE. Furthermore, using the anchor uplink subframe for uplink control information (UCI) reporting may allow more flexible use of other subframes on the uplink carrier. Besides uplink data transmission, some of the subframes on the uplink carrier may be allocated for downlink transmission to increase the peak data rate.

If an anchor uplink subframe is allocated with all symbols or the beginning part of symbols in the given uplink subframe, the minimum downlink HARQ-ACK association timing may be 2 subframes (e.g., the HARQ-ACK of a downlink data in subframe n may be reported in or after subframe n+2). If an anchor uplink subframe may be allocated with only a later part of all symbols in the given uplink subframe, the minimum downlink HARQ-ACK association timing may be 1 subframe (e.g., the HARQ-ACK of a downlink data in subframe n may be reported in or after subframe n+1). Depending on the UE capability or application and/or traffic type, the minimum processing time may be different.

For an FDD serving cell (e.g., a FDD NR serving cell), since downlink control may be available in every downlink subframe, a fixed uplink scheduling timing may be applied. For example, a fixed uplink scheduling timing may be applied 2 subframes after the downlink subframe issuing an uplink grant or 1 subframe after the downlink subframe if the uplink grant is always at the beginning downlink control region of a subframe. In another approach, the uplink data may be transmitted in the earliest uplink subframe that satisfies a minimum gap after the uplink grant.

Figure 11:
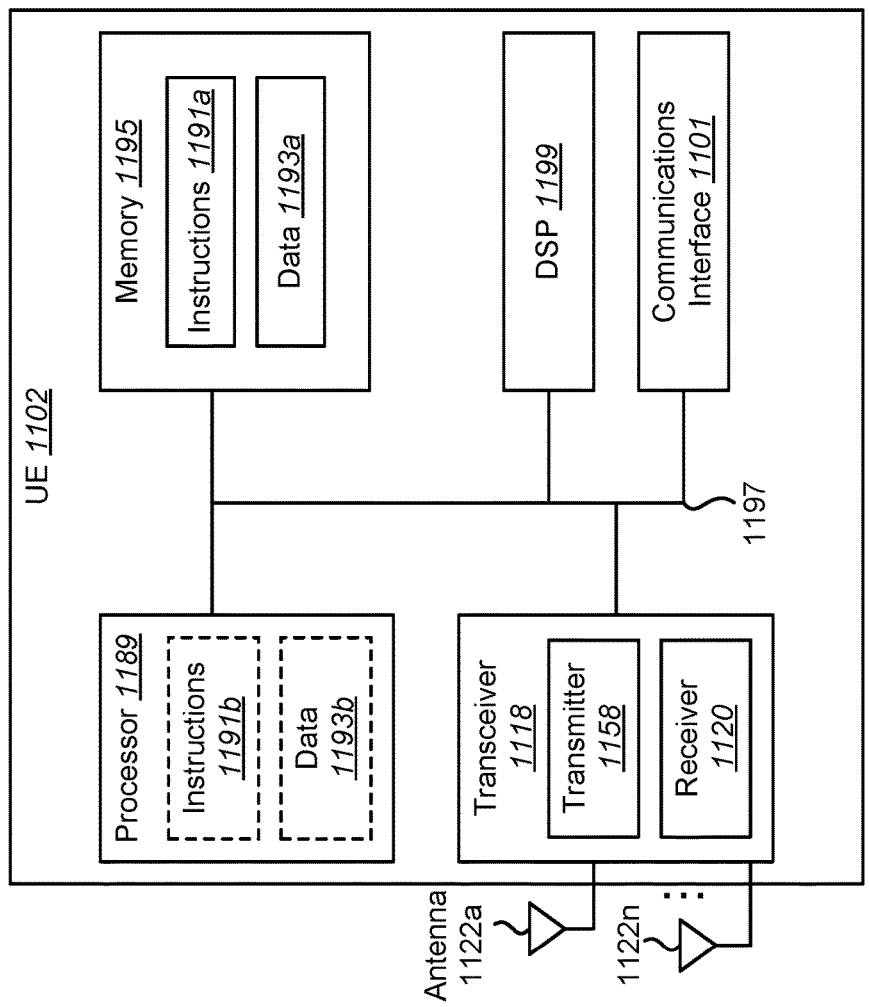
FIG. 11 illustrates various components that may be utilized in a UE.

FIG. 11 illustrates various components that may be utilized in a UE 1102. The UE 1102 described in connection with FIG. 11 may be implemented in accordance with the UE 102 described in connection with FIG. 1. The UE 1102 includes a processor 1189 that controls operation of the UE 1102. The processor 1189 may also be referred to as a central processing unit (CPU). Memory 1195, which may include read-only memory (ROM), random access memory (RAM), a combination of the two or any type of device that may store information, provides instructions 1191a and data 1193a to the processor 1189. A portion of the memory 1195 may also include non-volatile random access memory (NVRAM). Instructions 1191*b* and data 1193*b* may also reside in the processor 1189. Instructions 1191*b* and/or data 1193*b* loaded into the processor 1189 may also include instructions 1191*a* and/or data 1193*a* from memory 1195 that were loaded for execution or processing by the processor 1189. The instructions 1191*b* may be executed by the processor 1189 to implement the method 200 described in connection with FIG. 2.

The UE 1102 may also include a housing that contains one or more transmitters 1158 and one or more receivers 1120 to allow transmission and reception of data. The transmitter(s) 1158 and receiver(s) 1120 may be combined into one or more transceivers 1118. One or more antennas 1122*a-n* are attached to the housing and electrically coupled to the transceiver 1118.

The various components of the UE 1102 are coupled together by a bus system 1197, which may include a power bus, a control signal bus and a status signal bus, in addition to a data bus. However, for the sake of clarity, the various buses are illustrated in FIG. 11 as the bus system 1197. The UE 1102 may also include a digital signal processor (DSP) 1199 for use in processing signals. The UE 1102 may also include a communications interface 1101 that provides user access to the functions of the UE 1102. The UE 1102 illustrated in FIG. 11 is a functional block diagram rather than a listing of specific components.

Figure 12:
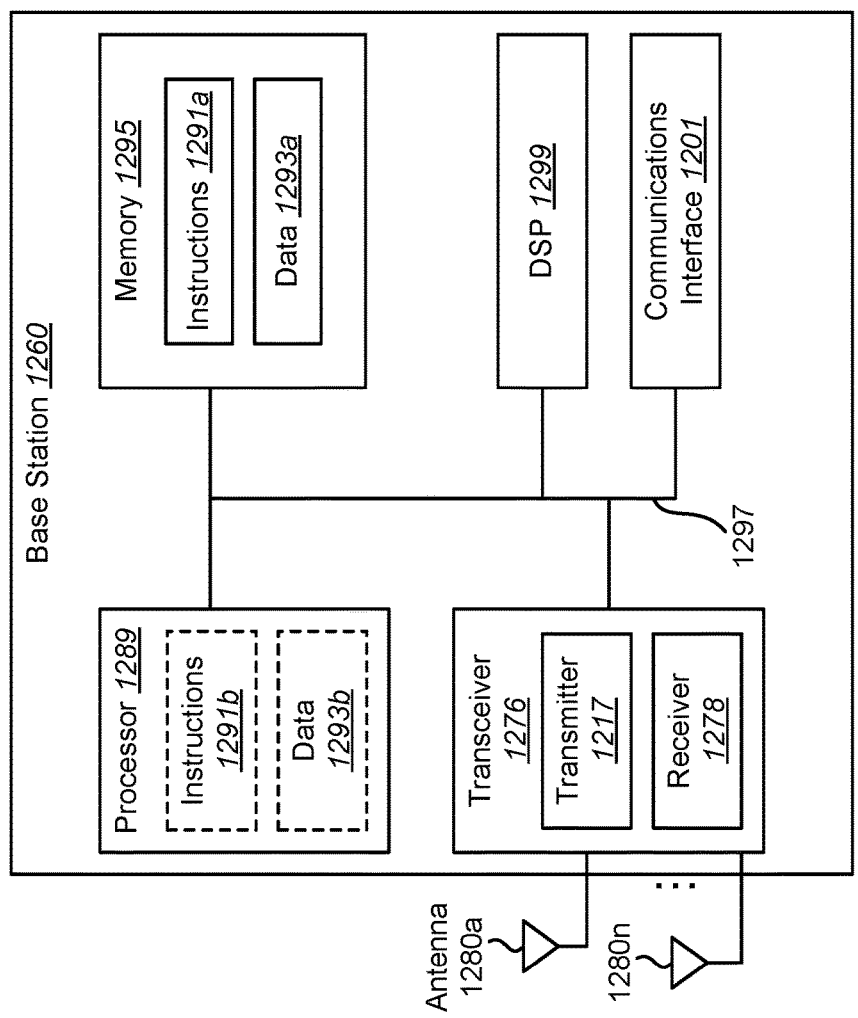
FIG. 12 illustrates various components that may be utilized in a base station.

FIG. 12 illustrates various components that may be utilized in a base station 1260 (e.g., eNB, gNB, etc.). The base station 1260 described in connection with FIG. 12 may be implemented in accordance with the base station 160 described in connection with FIG. 1. The base station 1260 includes a processor 1289 that controls operation of the base station 1260. The processor 1289 may also be referred to as a central processing unit (CPU). Memory 1295, which may include read-only memory (ROM), random access memory (RAM), a combination of the two or any type of device that may store information, provides instructions 1291*a* and data 1293*a* to the processor 1289. A portion of the memory 1295 may also include non-volatile random access memory (NVRAM). Instructions 1291*b* and data 1293*b* may also reside in the processor 1289. Instructions 1291*b* and/or data 1293*b* loaded into the processor 1289 may also include instructions 1291*a* and/or data 1293*a* from memory 1295 that were loaded for execution or processing by the processor 1289. The instructions 1291*b* may be executed by the processor 1289 to implement the method 300 described in connection with FIG. 3.

The base station 1260 may also include a housing that contains one or more transmitters 1217 and one or more receivers 1278 to allow transmission and reception of data. The transmitter(s) 1217 and receiver(s) 1278 may be combined into one or more transceivers 1276. One or more antennas 1280*a-n* are attached to the housing and electrically coupled to the transceiver 1276.

The various components of the base station 1260 are coupled together by a bus system 1297, which may include a power bus, a control signal bus and a status signal bus, in addition to a data bus. However, for the sake of clarity, the various buses are illustrated in FIG. 12 as the bus system 1297. The base station 1260 may also include a digital signal processor (DSP) 1299 for use in processing signals. The base station 1260 may also include a communications interface 1201 that provides user access to the functions of the base station 1260. The base station 1260 illustrated in FIG. 12 is a functional block diagram rather than a listing of specific components.

Figure 13:
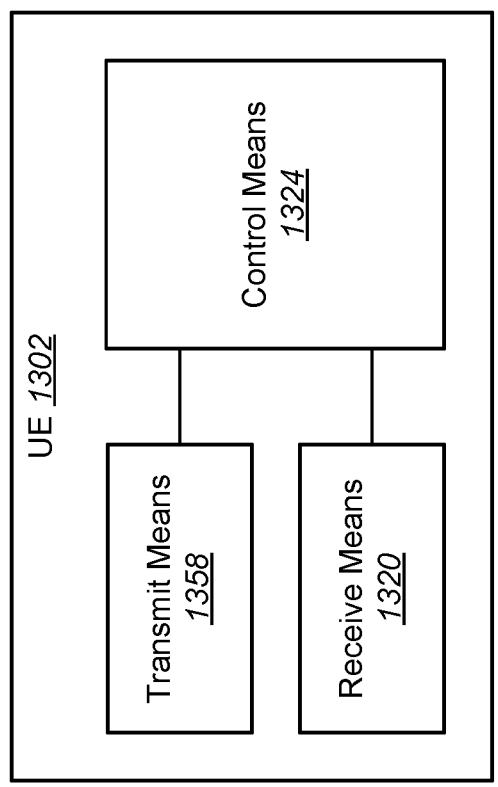
FIG. 13 is a block diagram illustrating one implementation of a UE in which systems and methods for determining frame structure and association timing may be implemented.

FIG. 13 is a block diagram illustrating one implementation of a UE 1302 in which systems and methods for determining frame structure and association timing may be implemented. The UE 1302 includes transmit means 1358, receive means 1320 and control means 1324. The transmit means 1358, receive means 1320 and control means 1324 may be configured to perform one or more of the functions described in connection with one or more of FIGS. 1-2 and 4-10 above. FIG. 11 above illustrates one example of a concrete apparatus structure of FIG. 13. Other various structures may be implemented to realize one or more of the functions of FIG. 1. For example, a DSP may be realized by software.

Figure 14:
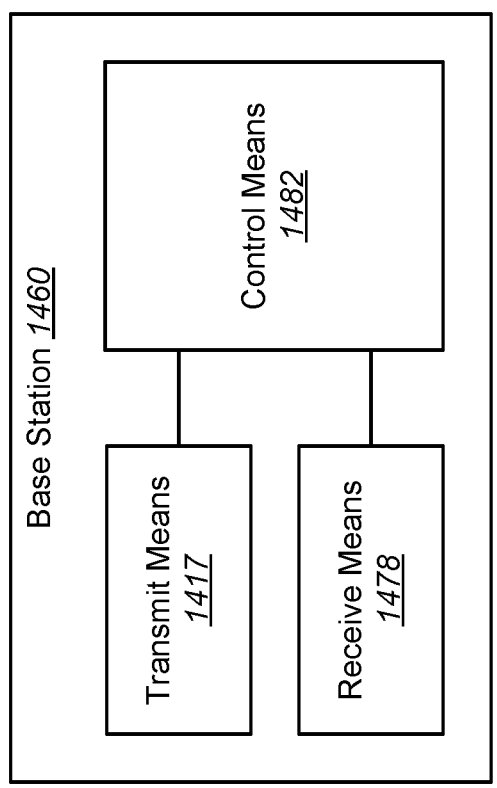
FIG. 14 is a block diagram illustrating one implementation of a base station in which systems and methods for determining frame structure and association timing may be implemented.

FIG. 14 is a block diagram illustrating one implementation of a base station 1460 in which systems and methods for determining frame structure and association timing may be implemented. The base station 1460 includes transmit means 1417, receive means 1478 and control means 1482. The transmit means 1417, receive means 1478 and control means 1482 may be configured to perform one or more of the functions described in connection with one or more of FIGS. 1 and 3-10. FIG. 12 above illustrates one example of a concrete apparatus structure of FIG. 14. Other various structures may be implemented to realize one or more of the functions of FIG. 1. For example, a DSP may be realized by software.

The term "computer-readable medium" refers to any available medium that may be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the base station 160 or the UE 102 according to the described systems and methods may be a program (a program for causing a computer to operate) that controls a CPU and the like in such a manner as to realize the function according to the described systems and methods. Then, the information that is handled in these apparatuses may be temporarily stored in a RAM while being processed. Thereafter, the information may be stored in various ROMs or HDDs, and whenever necessary, may be read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above may be realized by running the loaded program, and in addition, the function according to the described systems and methods may be realized in conjunction with an operating system or other application programs, based on an instruction from the program.

Furthermore, in a case where the programs are available on the market, the program stored on a portable recording medium may be distributed or the program may be transmitted to a server computer that connects through a network such as the Internet. In this case, a storage device in the server computer also is included. Furthermore, some or all of the base station 160 and/or the UE 102 according to the systems and methods described above may be realized as an LSI that is a typical integrated circuit. Each functional block of the base station 160 and/or the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device (e.g., UE) used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

As used herein, the term "and/or" should be interpreted to mean one or more items. For example, the phrase "A, B, and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B, and C" or the phrase "at least one of A, B, or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B, and C" or the phrase "one or more of A, B, or C" should be interpreted to mean any of: only A, only B, only C, A and B (but not C), B and C (but not A), A and C (but not B), or all of A, B, and C.

What is claimed is:

1. A user equipment (UE), comprising:
   a processor; and
   memory in electronic communication with the processor, wherein instructions stored in the memory are executable to:
   receive a physical downlink control channel (PDCCH) and decode a physical downlink shared channel (PDSCH);
   determine a hybrid automatic repeat request acknowledgement/negative acknowledgement (HARQ-ACK) feedback timing of the PDSCH; and
   transmit HARQ-ACK feedback of the PDSCH based on the determined HARQ-ACK feedback timing;
   wherein:
   the PDCCH uses a downlink control information (DCI) format that contains explicit timing information;
   the HARQ-ACK feedback timing is determined by the DCI format; and
   the HARQ-ACK feedback of the PDSCH is reported with explicit timing indicated by the explicit timing information.

2. A base station communicating with a user equipment (UE), the base station comprising:
   a processor; and
   memory in electronic communication with the processor, wherein instructions stored in the memory are executable to:
   transmit a physical downlink control channel (PDCCH) and a physical downlink shared channel (PDSCH);
   determine a hybrid automatic repeat request acknowledgement/negative acknowledgement (HARQ-ACK) feedback timing of the PDSCH;
   receive HARQ-ACK feedback of the PDSCH based on the determined HARQ-ACK feedback timing;
   wherein:
   the PDCCH uses a downlink control information (DCI) format that contains explicit timing information;
   the HARQ-ACK feedback timing is determined by the DCI format; and
   the HARQ-ACK feedback of the PDSCH is reported with explicit timing indicated by the explicit timing information.

3. A method of a user equipment (UE), the method comprising:
   receiving a physical downlink control channel (PDCCH) and decode a physical downlink shared channel (PDSCH);
   determining a hybrid automatic repeat request acknowledgement/negative acknowledgement (HARQ-ACK) feedback timing of the PDSCH; and transmitting HARQ-ACK feedback of the PDSCH based on the determined HARQ-ACK feedback timing; wherein:
the PDCCH uses a downlink control information (DCI) format that contains explicit timing information;
the HARQ-ACK feedback timing is determined by the DCI format; and
the HARQ-ACK feedback of the PDSCH is reported with explicit timing indicated by the explicit timing information.

4. A method of a base station communicating with a user equipment (UE), the method comprising:
transmitting a physical downlink control channel (PDCCH) and a physical downlink shared channel (PDSCH);
determining a hybrid automatic repeat request acknowledgement/negative acknowledgement (HARQ-ACK) feedback timing of the PDSCH;
receiving HARQ-ACK feedback of the PDSCH based on the determined HARQ-ACK feedback timing; wherein:
the PDCCH uses a downlink control information (DCI) format that contains explicit timing information;
the HARQ-ACK feedback timing is determined by the DCI format; and
the HARQ-ACK feedback of the PDSCH is reported with explicit timing indicated by the explicit timing information.

* * * * *